United States Patent
Deng et al.

(10) Patent No.: US 10,771,118 B2
(45) Date of Patent: Sep. 8, 2020

(54) CHANNEL STATE MEASUREMENT METHOD AND APPARATUS

(71) Applicant: HUAWEI TECHNOLOGIES CO., LTD., Shenzhen, Guangdong (CN)

(72) Inventors: Na Deng, Shenzhen (CN); Ting Wang, Shanghai (CN); Yuanjie Li, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/145,322

(22) Filed: Sep. 28, 2018

(65) Prior Publication Data

US 2019/0036569 A1    Jan. 31, 2019

Related U.S. Application Data

(63) Continuation of application No. PCT/CN2017/078848, filed on Mar. 30, 2017.

(30) Foreign Application Priority Data

Mar. 31, 2016 (CN) .......................... 2016 1 0200314

(51) Int. Cl.
*H04B 7/06* (2006.01)
*H04B 7/024* (2017.01)
(Continued)

(52) U.S. Cl.
CPC ............... *H04B 7/024* (2013.01); *H04B 7/04* (2013.01); *H04B 7/0417* (2013.01); *H04B 7/063* (2013.01);
(Continued)

(58) Field of Classification Search
CPC .... H04B 7/024; H04B 7/0417; H04B 7/0643; H04B 7/063; H04B 7/0639; H04B 7/0632; H04B 7/0626; H04B 7/04; H04W 24/10
See application file for complete search history.

(56) References Cited

U.S. PATENT DOCUMENTS 10,341,080 B2 * 7/2019 Wang .................. H04B 7/0632
10,448,274 B2 * 10/2019 Frenne ................ H04B 7/0647
(Continued)

FOREIGN PATENT DOCUMENTS

CN    102388667 A    3/2012
CN    102857279 A    1/2013
(Continued)

OTHER PUBLICATIONS

3GPP TS 36.212 V13.1.0 (Mar. 2016), 3rd Generation Partnership Project;Technical Specification Group Radio Access Network;Evolved Universal Terrestrial Radio Access (E-UTRA);Multiplexing and channel coding(Release 13), Mar. 29, 2016. total 129 pages.
(Continued)

*Primary Examiner* — Dac V Ha
(74) *Attorney, Agent, or Firm* — Fish & Richardson P.C.

(57) ABSTRACT

A channel state measurement method and an apparatus are provided. In embodiments of the present invention, a terminal receives CSI reporting mode indication information. The CSI reporting mode indication information is used to instruct the terminal to perform joint CSI measurement and feedback based on N pieces of associated CSI measurement configuration information. Therefore, the terminal may perform CSI measurement and feedback according to the CSI reporting mode indication information, so as to implement
(Continued)

CSI measurement and feedback in a scenario in which a plurality of coordinated transmission points perform coordinated transmission.

20 Claims, 9 Drawing Sheets

(51) Int. Cl.
*H04B 7/04* (2017.01)
*H04W 24/10* (2009.01)
*H04B 7/0417* (2017.01)

(52) U.S. Cl.
CPC ......... *H04B 7/0626* (2013.01); *H04B 7/0632* (2013.01); *H04B 7/0639* (2013.01); *H04B 7/0643* (2013.01); *H04W 24/10* (2013.01)

(56) References Cited

U.S. PATENT DOCUMENTS

| | | | |
|---|---|---|---|
| 2013/0039199 A1 | 2/2013 | Liao et al. | |
| 2013/0201823 A1 | 8/2013 | Gupta | |
| 2013/0242773 A1* | 9/2013 | Wernersson | H04B 7/024 370/252 |
| 2013/0301432 A1 | 11/2013 | Hammarwall et al. | |
| 2014/0219115 A1 | 8/2014 | Etemad et al. | |
| 2014/0301271 A1 | 10/2014 | Xu et al. | |
| 2015/0341942 A1* | 11/2015 | Lee | H04B 7/0626 370/252 |
| 2015/0349867 A1* | 12/2015 | Guo | H04L 1/0026 370/252 |
| 2016/0013901 A1* | 1/2016 | Lee | H04W 24/00 370/329 |
| 2016/0050005 A1 | 2/2016 | Hammarwall et al. | |
| 2016/0165466 A1* | 6/2016 | Kim | H04L 5/0057 370/252 |
| 2019/0013911 A1* | 1/2019 | Muruganathan | H04L 1/0026 |
| 2019/0132031 A1* | 5/2019 | Park | H04B 7/0456 |
| 2019/0281583 A1* | 9/2019 | Guo | H04L 5/0048 |

FOREIGN PATENT DOCUMENTS

| | | |
|---|---|---|
| CN | 105075205 A | 11/2015 |
| JP | 2015520982 A | 7/2015 |
| KR | 20140115338 A | 9/2014 |
| KR | 20150013140 A | 2/2015 |
| WO | 2012099516 A1 | 7/2012 |

OTHER PUBLICATIONS

3GPP TS 36.213 V13.1.0 (Mar. 2016), 3rd Generation Partnership Project;Technical Specification Group Radio Access Network;Evolved Universal Terrestrial Radio Access (E-UTRA);Physical layer procedures(Release 13), Mar. 29, 2016. total 361 pages.

International Search Report and Written Opinion issued in International Application No. PCT/CN2017/078848 dated Jun. 23, 2017, 24 pages.

"3 Generation Partnership Project; Technical Specification Group Radio Access Network; Evolved Universal Terrestrial Radio Access (E-UTRA); Physical layer procedures (Release 13)", 3GPP Standard; 3GPP TS 36.213, vol. RAN WG1, No. V13.0.1, Jan. 26, 2016, pp. 7-224, XP051087705.

Extended European Search Report issued in European Application No. 17773268.2 dated Mar. 26, 2019, 12 pages.

Office Action issued in Korean Application No. 2018-7031070 dated Jan. 17, 2020, 11 pages (with English translation).

Office Action issued in Korean Application No. 2018-7031070 dated Jun. 12, 2020, 3 pages (with English translation).

\* cited by examiner

Cell 1

Cell 2

CHANNEL STATE MEASUREMENT METHOD AND APPARATUS

CROSS-REFERENCE TO RELATED APPLICATIONS

This application is a continuation of International Application No. PCT/CN2017/078848, filed on Mar. 30, 2017, which claims priority to Chinese Patent Application No. 201610200314.5, filed on Mar. 31, 2016, The disclosures of the aforementioned applications are hereby incorporated by reference in their entireties.

TECHNICAL FIELD

The present invention relates to the communications field, and in particular, to a channel state measurement method and an apparatus.

BACKGROUND

A next-generation mobile communications system requires high-capacity and high-quality data transmission. A multiple-input multiple-output (MIMO for short) technology is considered as one of key technologies for implementing future high-speed data transmission, and has a wide application prospect in a 3rd generation (3G) mobile communications system and a 4th generation (4G) mobile communications system. A plurality of transmit antennas in a conventional centralized MIMO system are centralized at a base station (BS for short) end. Different from the centralized MIMO system, a plurality of transmit antennas in a distributed MIMO system are distributed in different geographical locations, so that each pair of receive and transmit links are more independent. The distributed MIMO system has advantages such as a large capacity, low power consumption, wide coverage, and minor electromagnetic damage to a human body, and is considered as one of alternative solutions to a future wireless communications system. In the distributed MIMO system, a space frequency block coding (SFBC for short) coordinated transmission method may be used to improve signal reliability of an edge user, and a coordinated multipoint multi-stream transmission method may be used to increase a cell throughput. The latter is not limited to an edge user, and is particularly applicable to a scenario in which transmission points are dense and have overlapping coverage (for example, a terminal is covered by a plurality of base stations).

Coordinated multipoint transmission/reception (CoMP) is considered as an effective method for reducing inter-cell interference and increasing an edge user throughput. CoMP means that a plurality of geographically separated transmission points cooperate to transmit data (such as a physical downlink shared channel (PDSCH for short)) of one terminal or jointly receive data (such as a physical uplink shared channel (PUSCH for short)) sent by one terminal. During joint transmission (Joint Transmission, JT for short) in the CoMP technology, different transmission points (such as base stations) transmit a same data stream to a terminal.

A channel state information (CSI for short) measurement and feedback solution that is for a scenario in which a plurality of transmission points perform coordinated transmission is expected.

SUMMARY

Embodiments of the present invention provide a channel state measurement method and an apparatus, so as to implement CSI measurement and feedback for a scenario in which a plurality of coordinated transmission points perform coordinated transmission.

According to a first aspect, an embodiment of the present invention provides a channel state measurement method, including:

receiving CSI reporting mode indication information, where the CSI reporting mode indication information is used to instruct to perform CSI measurement and feedback based on N pieces of associated CSI measurement configuration information, and N is an integer greater than 1; and performing CSI measurement and feedback according to the CSI reporting mode indication information.

Optionally, the CSI reporting mode indication information is first CSI reporting mode indication information; and the performing CSI measurement and feedback according to the CSI reporting mode indication information includes:

performing, according to the first CSI reporting mode indication information or according to the first CSI reporting mode indication information and transmission mode indication information, CSI measurement and feedback that are based on corresponding transmission.

Optionally, the performing CSI measurement that is based on corresponding transmission includes:

determining a PMI corresponding to a channel state information-reference signal CSI-RS indicated by each of the N pieces of associated CSI measurement configuration information; and determining, based on a downlink channel and interference that are corresponding to each of the N pieces of associated CSI measurement configuration information, a CQI corresponding to each of the N pieces of associated CSI measurement configuration information, where a downlink channel and interference that are corresponding to one piece of CSI measurement configuration information are obtained based on PMIs corresponding to CSI-RSs indicated by the N pieces of associated CSI measurement configuration information, and the interference corresponding to the CSI measurement configuration information includes interference outside antenna ports specified by the N pieces of associated CSI measurement configuration information, and interference obtained after a CSI-RS indicated by one piece of CSI measurement configuration information other than the CSI measurement configuration information is processed based on a corresponding PMI.

Optionally, the performing corresponding CSI feedback includes: feeding back N groups of CSI based on the N pieces of associated CSI measurement configuration information configured by a network side, where each group of CSI includes one or a combination of the following information: a rank indicator RI, a precoding matrix indicator PMI, and a channel quality indicator CQI.

The feeding back N groups of CSI based on the N pieces of associated CSI measurement configuration information configured by a network side includes:

if one CSI process is configured, having the N groups of CSI corresponding to the N pieces of associated CSI measurement configuration information in one feedback message, and feeding back the feedback message, where the N groups of CSI are sorted in a specified sequence; or if N CSI processes are configured, having one group of CSI corresponding to each piece of CSI measurement configuration information in one feedback message, and feeding back the feedback message, or having the N groups of CSI corresponding to the N pieces of associated CSI measurement configuration information in one feedback message, and feeding back the feedback message, where the N groups of CSI are sorted in a specified sequence.

Optionally, the CSI reporting mode indication information is second CSI reporting mode indication information; and the performing CSI measurement and feedback according to the CSI reporting mode indication information includes:

performing, according to the second CSI reporting mode indication information, CSI measurement and feedback that are based on transmit diversity-related transmission.

The performing, according to the second CSI reporting mode indication information, CSI measurement that is based on transmit diversity-related transmission includes:

determining a PMI corresponding to a CSI-RS indicated by each of the N pieces of associated CSI measurement configuration information; and determining, based on downlink channels and interference that are corresponding to the N pieces of associated CSI measurement configuration information and based on a transmit diversity-related transmission mode, a joint CQI corresponding to the N pieces of associated CSI measurement configuration information, where a downlink channel and interference that are corresponding to one piece of CSI measurement configuration information are obtained based on PMIs corresponding to CSI-RSs indicated by the N pieces of associated CSI measurement configuration information, and the interference corresponding to the CSI measurement configuration information includes interference outside antenna ports specified by the N pieces of associated CSI measurement configuration information.

The performing CSI feedback that is based on transmit diversity-related transmission includes: feeding back a PMI based on each of the N pieces of associated CSI measurement configuration information corresponding to transmit diversity-related transmission, and feeding back a joint CQI based on the N pieces of associated CSI measurement configuration information.

More specifically, the feeding back a PMI based on each of the N pieces of associated CSI measurement configuration information corresponding to transmit diversity-related transmission, and feeding back a joint CQI based on the N pieces of associated CSI measurement configuration information includes:

if one CSI process is configured, feeding back one feedback message, where the feedback message includes the joint CQI and the PMIs corresponding to the CSI-RSs indicated by the N pieces of associated CSI measurement configuration information, and the joint CQI and the PMIs corresponding to the CSI-RSs indicated by the N pieces of associated CSI measurement configuration information are sorted in a specified sequence;

if N CSI processes are configured, feeding back one feedback message, where the feedback message includes the joint CQI and the PMIs corresponding to the CSI-RSs indicated by the N pieces of associated CSI measurement configuration information, and the joint CQI and the PMIs corresponding to the CSI-RSs indicated by the N pieces of associated CSI measurement configuration information are sorted in a specified sequence;

if N CSI processes are configured, feeding back N feedback messages, where each feedback message is corresponding to one CSI process and includes the joint CQI and a PMI corresponding to one CSI process;

if N CSI processes are configured, feeding back N feedback messages, where each feedback message is corresponding to one CSI process and includes a PMI corresponding to one CSI process, one of the N feedback messages further includes the joint CQI, and a feedback message for feeding back the joint CQI is agreed in advance, or a terminal notifies a base station of a feedback message for feeding back the joint CQI; or if N CSI processes are configured, feeding back N+1 feedback messages, where the N+1 feedback messages are sorted in a specified sequence, each of the N feedback messages is corresponding to one CSI process and includes a PMI corresponding to one CSI process, and the other feedback message includes the joint CQI.

Optionally, if PMI and RI feedback are not configured to be performed, the method further includes: receiving measurement indication information, where the measurement indication information is used to instruct to perform CSI measurement based on a CSI-RS or a cell-specific reference signal CRS.

Optionally, the N pieces of associated CSI measurement configuration information include CSI-RS resources of N coordinated transmission points; and the CSI-RS resources of the N coordinated transmission points are configured by using one CSI process, and the CSI process includes the CSI-RS resources of the N coordinated transmission points; or the CSI-RS resources of the N coordinated transmission points are configured by using N CSI processes, and each CSI process includes a CSI-RS resource of one coordinated transmission point.

One CSI process includes the CSI-RS resources of the N coordinated transmission points, and the CSI-RS resources of the N coordinated transmission points are differentiated by using indication information.

Optionally, the CSI reporting mode indication information is sent by using higher layer signaling.

According to a second aspect, an embodiment of the present invention provides a channel state feedback method, including:

sending CSI reporting mode indication information, where the CSI reporting mode indication information is used to instruct to perform CSI measurement and feedback based on N pieces of associated CSI measurement configuration information, and N is an integer greater than 1; and receiving CSI fed back after CSI measurement is performed according to the CSI reporting mode indication information.

Optionally, the CSI reporting mode indication information is first CSI reporting mode indication information; and the first CSI reporting mode indication information is used to instruct to perform CSI measurement and feedback that are based on corresponding transmission; or the first CSI reporting mode indication information and transmission mode indication information are used to instruct to perform CSI measurement and feedback that are based on corresponding transmission.

Optionally, the first CSI reporting mode indication information is specifically used to instruct to perform the following operations:

determining a PMI corresponding to a CSI-RS indicated by each of the N pieces of associated CSI measurement configuration information; and determining, based on a downlink channel and interference that are corresponding to each of the N pieces of associated CSI measurement configuration information, a CQI corresponding to each of the N pieces of associated CSI measurement configuration information, where a downlink channel and interference that are corresponding to one piece of CSI measurement configuration information are obtained based on PMIs corresponding to CSI-RSs indicated by the N pieces of associated CSI measurement configuration information, and the interference corresponding to the CSI measurement configuration information includes interference outside antenna ports specified by the N pieces of associated CSI measurement configuration information, and interference obtained after corresponding PMI processing is performed on one piece of CSI measurement configuration information other than the CSI measurement configuration information.

The received CSI includes N groups of CSI fed back based on the N pieces of associated CSI measurement configuration information configured by a network side, where each group of CSI includes one or a combination of the following information: a rank indicator RI, a precoding matrix indicator PMI, and a channel quality indicator CQI.

More specifically, if one CSI process is configured, the N groups of CSI corresponding to the N pieces of associated CSI measurement configuration information are included in one feedback message, and the N groups of CSI are sorted in a specified sequence; or if N CSI processes are configured, one group of CSI corresponding to each piece of CSI measurement configuration information is included in one feedback message, or the N groups of CSI corresponding to the N pieces of associated CSI measurement configuration information are included in one feedback message, and the N groups of CSI are sorted in a specified sequence.

Optionally, the CSI reporting mode indication information is second CSI reporting mode indication information; and the second CSI reporting mode indication information is used to instruct to perform CSI measurement and feedback that are based on transmit diversity-related transmission.

The second CSI reporting mode indication information is specifically used to instruct to perform the following operations:

determining a PMI corresponding to a CSI-RS indicated by each of the N pieces of associated CSI measurement configuration information; and determining, based on downlink channels and interference that are corresponding to the N pieces of associated CSI measurement configuration information and based on a transmit diversity-related transmission mode, a joint CQI corresponding to the N pieces of associated CSI measurement configuration information, where a downlink channel and interference that are corresponding to one piece of CSI measurement configuration information are obtained based on PMIs corresponding to CSI-RSs indicated by the N pieces of associated CSI measurement configuration information, and the interference corresponding to the CSI measurement configuration information includes interference outside antenna ports specified by the N pieces of associated CSI measurement configuration information.

More specifically, the received CSI includes a PMI fed back based on each of the N pieces of associated CSI measurement configuration information corresponding to transmit diversity-related transmission, and a joint CQI fed back based on the N pieces of associated CSI measurement configuration information.

If one CSI process is configured, one feedback message is fed back, where the feedback message includes the joint CQI and the PMIs corresponding to the CSI-RSs indicated by the N pieces of associated CSI measurement configuration information, and the joint CQI and the PMIs corresponding to the CSI-RSs indicated by the N pieces of associated CSI measurement configuration information are sorted in a specified sequence;

if N CSI processes are configured, one feedback message is fed back, where the feedback message includes the joint CQI and the PMIs corresponding to the CSI-RSs indicated by the N pieces of associated CSI measurement configuration information, and the joint CQI and the PMIs corresponding to the CSI-RSs indicated by the N pieces of associated CSI measurement configuration information are sorted in a specified sequence;

if N CSI processes are configured, N feedback messages are fed back, where each feedback message is corresponding to one CSI process and includes the joint CQI and a PMI corresponding to one CSI process;

if N CSI processes are configured, N feedback messages are fed back, where each feedback message is corresponding to one CSI process and includes a PMI corresponding to one CSI process, one of the N feedback messages further includes the joint CQI, and a feedback message for feeding back the joint CQI is agreed in advance, or a terminal notifies a base station of a feedback message for feeding back the joint CQI; or if N CSI processes are configured, N+1 feedback messages are fed back, where the N+1 feedback messages are sorted in a specified sequence, each of the N feedback messages is corresponding to one CSI process and includes a PMI corresponding to one CSI process, and the other feedback message includes the joint CQI.

Optionally, if PMI and RI feedback are not configured to be performed, the method further includes: sending measurement indication information, where the measurement indication information is used to instruct to perform CSI measurement based on a CSI-RS or a cell-specific reference signal CRS.

Optionally, the N pieces of associated CSI measurement configuration information include CSI-RS resources of N coordinated transmission points; and the CSI-RS resources of the N coordinated transmission points are configured by using one CSI process, and the CSI process includes the CSI-RS resources of the N coordinated transmission points; or the CSI-RS resources of the N coordinated transmission points are configured by using N CSI processes, and each CSI process includes a CSI-RS resource of one coordinated transmission point.

One CSI process includes the CSI-RS resources of the N coordinated transmission points, and the CSI-RS resources of the N coordinated transmission points are differentiated by using indication information.

Optionally, the CSI reporting mode indication information is sent by using higher layer signaling.

According to a third aspect, an embodiment of the present invention further provides a wireless communications apparatus. Specifically, the apparatus may be configured to perform channel state measurement, and includes a function module required for implementing the method provided in the first aspect. Details of division and description of a specific function module are not described herein.

According to a fourth aspect, an embodiment of the present invention provides a wireless communications apparatus. Specifically, the apparatus may be configured to perform channel state measurement, and includes a function module required for implementing the method provided in the second aspect. Details of division and description of a specific function module are not described herein.

According to a fifth aspect, an embodiment of the present invention provides a network device, including a transceiver, a processor, and a memory. The network device is a specific structure carrying a function module in the third aspect.

The memory is configured to store a computer program instruction.

The processor is coupled to the memory and is configured to: read the computer program instruction stored in the memory, and execute the method in the first aspect.

For a procedure executed by the processor, refer to the foregoing channel state information feedback procedure. Details are not described herein again.

According to a sixth aspect, an embodiment of the present invention provides a network device, including a transceiver, a processor, and a memory. The network device is a specific structure carrying a function module in the fourth aspect.

The memory is configured to store a computer program instruction.

The processor is coupled to the memory and is configured to: read the computer program instruction stored in the memory, and execute the method in the second aspect.

According to a seventh aspect, an embodiment of the present invention further provides a program storage medium. When a program stored in the program storage medium is executed, the method provided in the first aspect or the second aspect may be implemented.

For a procedure executed by the processor, refer to the foregoing channel state information feedback procedure. Details are not described herein again.

In the embodiments of the present invention, a first network device receives CSI reporting mode indication information. The CSI reporting mode indication information is used to instruct a second network device to perform joint CSI measurement and feedback based on N pieces of associated CSI measurement configuration information. Therefore, the first network device may perform CSI measurement and feedback according to the CSI reporting mode indication information, so as to implement CSI measurement and feedback in a scenario in which a plurality of coordinated transmission points perform coordinated transmission.

DESCRIPTION OF EMBODIMENTS

Figure 1A:
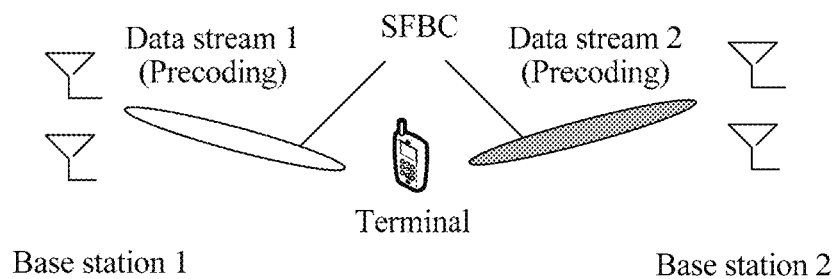
FIG. 1a and FIG. 1b are separately schematic diagrams of coordinated multipoint diversity transmission.

Currently, CSI measurement is performed only to measure a PMI (precoding matrix indicator) and a CQI (channel quality indicator) of a single cell during single cell transmission, or is performed to measure a PMI and a CQI during joint transmission and transmission of a same signal. However, for coordinated multipoint diversity transmission or coordinated multipoint multi-stream transmission, if CSI measurement is performed in the foregoing manner, the measurement is inaccurate, thereby deteriorating communication performance.

In view of the above, for a scenario in which a plurality of coordinated transmission points perform coordinated transmission, embodiments of the present invention provide a channel state measurement solution to implement CSI measurement and feedback. A MIMO technology (including a diversity technology for improving transmission reliability or a multi-stream technology for improving a data transmission rate) is combined with a coordinated multipoint transmission/reception technology to better serve a user.

The embodiments of the present invention are applicable to both a homogeneous network scenario and a heterogeneous network scenario. A type of a transmission point that uses a coordinated transmission technology is not limited in the embodiments of the present invention, and may be, for example, various types of base stations. Coordinated multipoint transmission/reception may be performed by different types of transmission points.

A device in the embodiments of the present invention includes a first network device and a second network device. The second network device may configure the first network device to perform CSI measurement and feedback for a plurality of coordinated transmission points. The first network device may perform CSI measurement and feedback for the plurality of coordinated transmission points based on configuration information sent by the second network device. The first network device may be a terminal. The second network device may be a base station or another type of transmission point device, and certainly is not limited to the foregoing two types of devices. For example, the second network device may alternatively be a terminal that can configure another terminal.

The base station may be an evolved NodeB (eNB or e-NodeB), a macro base station, a micro base station (also referred to as a "small cell"), a pico base station, an access point (AP for short), a transmission point (TP for short), or the like in an LTE system or in an evolved system of the LTE system, or may be a base station in a future network, for example, a base station in a 5G network.

In the embodiments of the present invention, the terminal may also be referred to as user equipment (UE for short), or may also be referred to as a terminal, a mobile station (MS for short), a mobile terminal (Mobile Terminal), or the like.

The terminal may communicate with one or more core networks by using a radio access network (RAN for short). For example, the terminal may be a mobile phone (or referred to as a "cell" phone) or a computer having a mobile terminal function. For example, the terminal may alternatively be a portable, pocket-sized, handheld, computer built-in, or in-vehicle mobile apparatus that exchanges voice and/or data with the radio access network. The terminal in the embodiments of the present invention may alternatively be a D2D (device-to-device) terminal or an M2M (machine-to-machine) terminal.

For ease of description, the following embodiments use the terminal as a first network device and use the base station as a second network device as an example for description.

The embodiments of the present invention are applicable to a coordinated multipoint transmission/reception scenario, for example, may be applicable to transmit diversity-related transmission, and more specifically, to coordinated multipoint diversity transmission; or may be applicable to spatial multiplexing-related transmission, and more specifically, to coordinated multipoint multi-stream transmission.

Figure 1B:
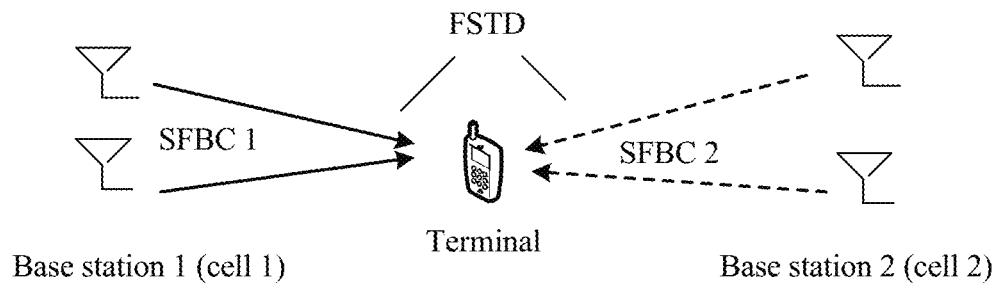

The coordinated multipoint diversity transmission means that antennas distributed on two or more transmission points coordinately send a transmission signal on which SFBC processing is performed. The two or more transmission points may be two or more base stations, or may be two or more radio frequency unit processors that are of a distributed base station and whose geographical locations are separated by a relatively long distance. A similarity between a CoMP transmission technology and the coordinated multipoint diversity transmission technology is that a same data stream is transmitted to a terminal, and the coordinated multipoint diversity transmission technology is different from the CoMP transmission technology at least in the following aspect: In the coordinated multipoint diversity transmission technology, SFBC processing needs to be performed before a data stream is sent by using an antenna. For example, in one method, as shown in FIG. 1a, a base station 1 and a base station 2 perform joint transmission by using an SFBC-based transmit diversity. Each base station performs layer mapping on a modulated symbol of a same code word to obtain one transmission layer data stream, and performs precoding on the transmission layer data stream. The two base stations jointly perform SFBC processing on two transmission layer data streams corresponding to the code word, and then map the two transmission layer data streams to an antenna port and send the two transmission layer data streams. Optionally, the base stations use a same code word. In another method, as shown in FIG. 1b, a base station 1 and a base station 2 perform joint transmission by using an SFBC+FSTD (frequency switched transmit diversity)-based transmit diversity. Each base station performs layer mapping on a modulated symbol of a same code word to obtain two transmission layer data streams, and performs precoding on the two transmission layer data streams. Then the two base stations perform SFBC+FSTD processing on the four transmission layer data streams corresponding to the code word, and then map the four transmission layer data streams to an antenna port and send the four transmission layer data streams. Optionally, the base stations use a same code word.

Figure 2:
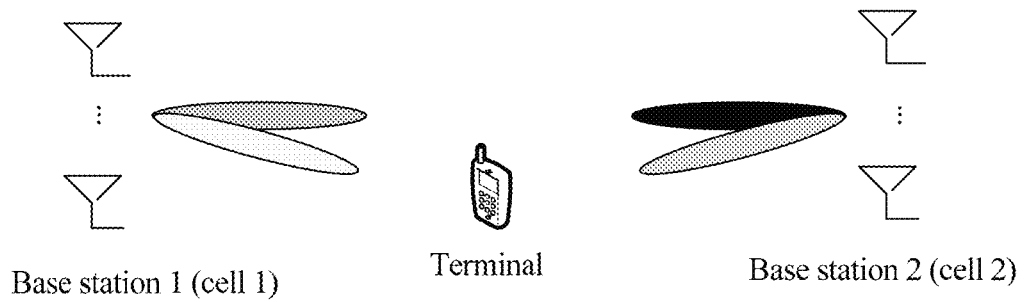
FIG. 2 is a schematic diagram of coordinated multipoint multi-stream transmission.

In coordinated multipoint multi-stream transmission, at least two transmission points, for example, two or more base stations or different RRUs of a distributed base station separately perform layer mapping on a modulation symbol of a same code word to separately obtain two transmission layer data streams, separately perform precoding on the two transmission layer data streams, and then map the two transmission layer data streams to an antenna port after the precoding processing and send the two transmission layer data streams. Optionally, the transmission points use different code words. Each transmission point may transmit different data streams to a same terminal. For example, in a method, as shown in FIG. 2, a base station 1 determines a transmission rank of downlink data of a cell 1 based on channel state information of the cell 1 and performs corresponding precoding processing (in the figure, for example, the rank of the downlink data of the cell 1 is 2). A base station 2 determines a transmission rank of downlink data of a cell 2 based on channel state information of the cell 2 and performs corresponding precoding processing (in the figure, the rank of the downlink data of the cell 2 is 2). The base station 1 and the base station 2 coordinately transmit four transmission layer data streams to a terminal.

Because of the foregoing differences between coordinated multipoint transmission/reception (for example, the foregoing coordinated multipoint diversity transmission or coordinated multipoint multi-stream transmission) and conventional CoMP transmission, measured CSI is inaccurate when a CSI measurement method in a conventional CoMP system is still used, and therefore an MCS (Modulation and Coding Scheme) selected by a base station based on CSI measured and reported by a terminal is inaccurate, thereby affecting system transmission performance.

In view of the above, in the channel state measurement solution provided in the embodiments of the present invention, for coordinated multipoint transmission/reception, a precoding matrix and an interference status of a cell are considered when CSI measurement is being performed, thereby ensuring CSI measurement precision.

In the embodiments of the present invention, a CSI reporting mode is newly added, and indication information for the CSI reporting mode is further added. The CSI reporting mode indication information is used to instruct to perform CSI measurement and feedback based on N pieces of associated CSI measurement configuration information, and N is an integer greater than 1. In the embodiments of this application, CSI measurement and feedback are performed based on the N pieces of associated CSI measurement configuration information. Therefore, be distinguished from CSI measurement and feedback in the prior art, CSI measurement and feedback performed by using the method in the embodiments of the present invention are referred to as joint CSI measurement and feedback.

The N pieces of associated CSI measurement configuration information may be corresponding to a plurality of separated coordinated transmission points in N geographical locations, and signals sent from these transmission points have different large-scale fading characteristics. The large-scale fading characteristics include one or more of a delay spread, a Doppler spread, a Doppler frequency shift, an average channel gain, and an average delay. The "coordinated transmission point" in the embodiments of the present invention is a transmission point used for coordinated transmission. One coordinated transmission point is one transmission point in a coordination set, for example, may be a base station. Further, a coordinated transmission point may be a serving base station or a coordinated base station. One coordinated transmission point may alternatively be one radio frequency unit of a distributed base station.

Each of the N pieces of associated CSI measurement configuration information is corresponding to CSI measurement configuration information of N coordinated transmission points that perform coordinated transmission, and CSI measurement configuration information of one coordinated transmission point includes at least a CSI-RS (channel state information-reference signal) resource.

Considering that coordinated multipoint transmission/reception may specifically include a plurality of transmission modes, such as a transmission mode related to spatial multiplexing (more specifically, a coordinated multipoint multi-stream transmission mode) and a transmission mode related to a transmit diversity (more specifically, a coordinated multipoint diversity transmission mode). Therefore, the CSI reporting mode indication information newly added in the embodiments of the present invention may specifically include first CSI reporting mode indication information and/or second CSI reporting mode indication information, and may be used in the foregoing coordinated multipoint transmission/reception mode.

Specifically, the first CSI reporting mode indication information may be used to instruct to perform joint CSI measurement and feedback that are based on spatial multiplexing-related transmission (for example, coordinated multipoint multi-stream transmission). Alternatively, the first CSI reporting mode indication information and transmission mode indication information (the transmission mode indication information is used to instruct to perform spatial multiplexing-related transmission, and more specifically, to instruct to perform coordinated multipoint multi-stream transmission) may be used to instruct to perform CSI measurement and feedback that are based on a corresponding transmission mode. In an example in which the first CSI reporting mode indication information and the transmission mode indication information are used for instruction, the transmission mode indication information is used to instruct to perform coordinated multipoint multi-stream transmission, and the first CSI reporting mode indication information is used to instruct to perform joint CSI measurement and feedback that are based on a transmission mode indicated by the transmission mode indication information.

Coordinated multipoint multi-stream transmission is used as an example. A terminal may perform, according to the first CSI reporting mode indication information, joint CSI measurement that is based on coordinated multipoint multi-stream transmission, and feed back N groups of CSI based on the N pieces of associated CSI measurement configuration information configured by a network side. Each group of CSI includes one or a combination of the following information: an RI (rank indication), a PMI, and a CQI. Herein, the N pieces of associated CSI measurement configuration information configured by the network side may be N pieces of associated CSI measurement configuration information of coordinated multipoint multi-stream transmission.

The second CSI reporting mode indication information may be used to instruct to perform joint CSI measurement and feedback that are based on transmit diversity-related transmission. Alternatively, the second CSI reporting mode indication information and transmission mode indication information (the transmission mode indication information is used to instruct to perform transmit diversity-related transmission, more specifically, to instruct to perform coordinated multipoint diversity transmission) are used to instruct to perform joint CSI measurement and feedback that are based on a corresponding transmission mode. In an example in which the second CSI reporting mode indication information and the transmission mode indication information are used for instruction, the transmission mode indication information is used to instruct to perform coordinated multipoint diversity transmission, and the second CSI reporting mode indication information is used to instruct to perform joint CSI measurement and feedback that are based on a transmission mode indicated by the transmission mode indication information.

Coordinated multipoint diversity transmission is used as an example. A terminal may perform, according to the second CSI reporting mode indication information, joint CSI measurement that is based on coordinated multipoint diversity transmission, and feed back one group of CSI based on each of the N pieces of associated CSI measurement configuration information on which coordinated multipoint diversity transmission is performed. The group of CSI includes a PMI corresponding to each piece of CSI measurement configuration information and a joint CQI corresponding to the N pieces of associated CSI measurement configuration information. An RI corresponding to the PMI is 1. For transmit diversity-related transmission, a transmission rank is 1. Therefore, CSI fed back when CSI feedback is performed may not include an RI.

For example, a first CSI reporting mode may be represented by Mode 4-1. The terminal performs joint CSI measurement according to the CSI reporting mode indication information and based on coordinated multipoint multi-stream transmission, and feeds back N groups of CSI. Each group of CSI is corresponding to one piece of CSI measurement configuration information or one coordinated transmission point, and one group of CSI includes an RI, a PMI, and a CQI that are obtained through measurement for one coordinated transmission point. A second CSI reporting mode may be represented by Mode 4-2. The terminal may perform joint CSI measurement according to the CSI reporting mode indication information and based on coordinated multipoint diversity transmission, and feeds back one group of CSI. The group of CSI includes a PMI corresponding to each of the N pieces of associated CSI measurement configuration information, and further includes a joint CQI corresponding to the N pieces of associated CSI measurement configuration information or a joint CQI corresponding to N coordinated transmission points. As described above, the N pieces of associated CSI measurement configuration information may be corresponding to a plurality of separated coordinated transmission points in N geographical locations, and therefore the PMI corresponding to each of the N pieces of associated CSI measurement configuration information may be understood as a PMI corresponding to each of the N coordinated transmission points.

The N pieces of associated CSI measurement configuration information may be configured for the terminal by using one CSI process or N CSI processes. One CSI process may include one or more pieces of CSI-RS resource configuration information. The terminal may perform CSI-RS measurement on a resource indicated by CSI-RS resource configuration information, that is, perform downlink channel measurement. The term "a plurality of" means two or more. In another embodiment, the N pieces of associated CSI measurement configuration information may be configured for the terminal by using M (M is an integer greater than 1 and less than N) CSI processes, some CSI processes include a plurality of pieces of CSI measurement configuration information, and some CSI processes include one piece of CSI measurement configuration information.

If the N pieces of associated CSI measurement configuration information are configured for the terminal by using one CSI process, the CSI process includes CSI-RS resources of N coordinated transmission points. If the N pieces of associated CSI measurement configuration information are configured for the terminal by using N CSI processes, each of the N CSI processes is used to configure CSI measurement configuration information of one of the N coordinated transmission points, that is, one CSI process is corresponding to one coordinated transmission point. In an example, the base station configures two CSI processes for the terminal, and the terminal performs CSI measurement based on the two processes, and feeds back measured CSI to the base station by using a measurement report. CSI corresponding to different CSI processes may be differentiated by using serial numbers.

Further, if one CSI process includes CSI-RS resources of N coordinated transmission points, the CSI-RS resources of the N coordinated transmission points are differentiated by using indication information. For example, the CSI-RS resources of the coordinated transmission points may be numbered, so that the terminal distinguishes between the CSI-RS resources of the coordinated transmission points after receiving the CSI-RS resources. Likewise, if one CSI process includes CSI-RS resources of a plurality of (less than N) coordinated transmission points, the CSI-RS resources of the plurality of coordinated transmission points may be distinguished by using indication information.

The CSI reporting mode indication information may be configured by using higher layer signaling, and the base station may notify, by using higher layer signaling, the terminal of a manner of performing CSI reporting.

The following describes the embodiments of the present invention in detail with reference to accompanying drawings.

In the following embodiments, the "terminal" may be replaced with a first network device, and the "base station" may be replaced with a second network device.

Figure 3:
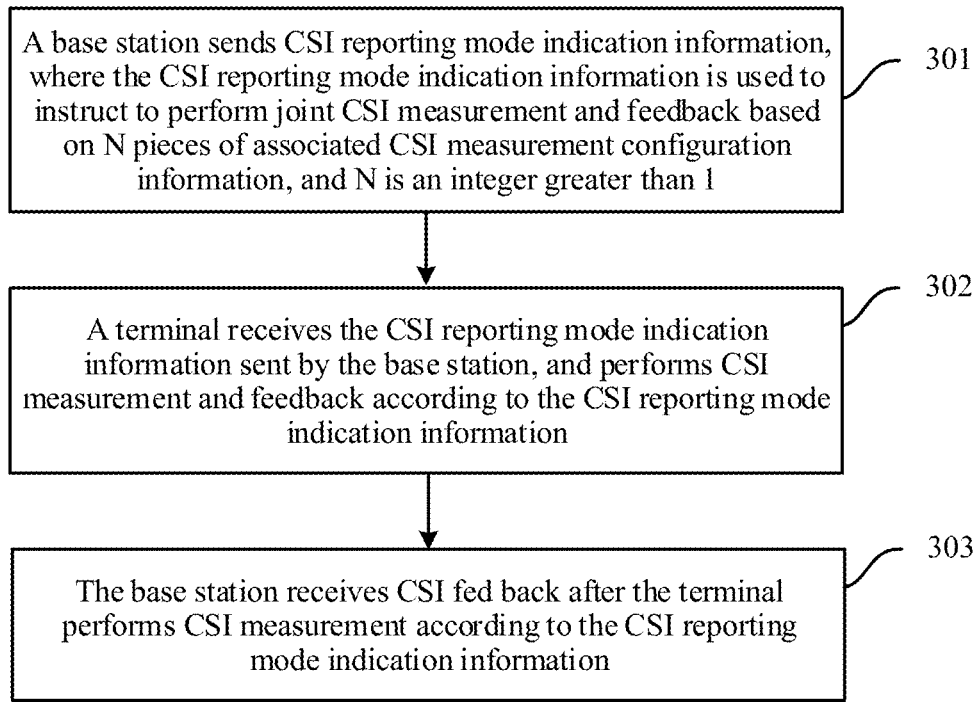
FIG. 3 is a schematic flowchart of a channel state measurement procedure according to an embodiment of the present invention.

Referring to FIG. 3, FIG. 3 is a schematic diagram of a channel state measurement procedure according to an embodiment of the present invention. As shown in the figure, the procedure may include the following steps.

Step 301: A base station sends CSI reporting mode indication information, where the CSI reporting mode indication information is used to instruct to perform joint CSI measurement and feedback based on N pieces of associated CSI measurement configuration information, and N is an integer greater than 1.

Specifically, the base station may send the CSI reporting mode indication information by using higher layer signaling.

As described above, the CSI reporting mode indication information sent by the base station may include first CSI reporting mode indication information and second CSI reporting mode indication information. The first CSI reporting mode indication information may be used to instruct a terminal to perform joint CSI measurement and feedback that are based on spatial multiplexing-related transmission (for example, coordinated multipoint multi-stream transmission), and the second CSI reporting mode indication information may be used to instruct the terminal to perform joint CSI measurement and feedback that are based on transmit diversity-related transmission (for example, coordinated multipoint diversity transmission).

In an example, when N base stations perform coordinated multipoint multi-stream transmission for the terminal, one of the N base stations may send the first CSI reporting mode indication information to the terminal. In another example, when N base stations perform coordinated multipoint diversity transmission for the terminal, one of the N base stations may send the second CSI reporting mode indication information to the terminal.

The N pieces of associated CSI measurement configuration information in this step may be configured by the base station for the terminal. As described above, the N pieces of associated CSI measurement configuration information may be configured for the terminal by using one CSI process, N CSI processes, or M (M is an integer greater than 1 and less than N) CSI processes. If the N pieces of associated CSI measurement configuration information are configured for the terminal by using one CSI process, the CSI process includes CSI-RS resources of N coordinated transmission points. If the N pieces of associated CSI measurement configuration information are configured for the terminal by using N CSI processes, each of the N CSI processes is used to configure CSI measurement configuration information of one of the N coordinated transmission points. If the N pieces of associated CSI measurement configuration information are configured for the terminal by using M CSI processes, some CSI processes include a plurality of pieces of CSI measurement configuration information, and some CSI processes include one piece of CSI measurement configuration information.

Step 302: A terminal receives the CSI reporting mode indication information sent by the base station, and performs joint CSI measurement and feedback according to the CSI reporting mode indication information.

In this step, the terminal may perform joint CSI measurement and feedback based on the received CSI reporting mode indication information and a precoding matrix corresponding to each of the N pieces of associated CSI measurement configuration information.

More specifically, if the CSI reporting mode indication information received by the terminal is the first CSI reporting mode indication information, the terminal performs, according to the first CSI reporting mode indication information, joint CSI measurement that is based on spatial multiplexing-related transmission (for example, coordinated multipoint multi-stream transmission) to obtain N groups of CSI, and feeds back the N groups of CSI. Each group of CSI includes one or a combination of the following information: an RI, a PMI, and a CQI. Certainly, the terminal may alternatively perform, based on the received first CSI reporting mode indication information and transmission mode indication information (the transmission mode indication information is used to instruct to perform spatial multiplexing-related transmission, for example, coordinated multipoint multi-stream transmission), joint CSI measurement that is based on spatial multiplexing-related transmission (such as coordinated multipoint multi-stream transmission).

Further, when the terminal receives the first CSI reporting mode indication information, if the base station configures one CSI process for the terminal, the terminal has the N groups of CSI in one feedback message and feeds back the feedback message, and the N groups of CSI are sorted in a specified sequence. The specified sequence may be a pre-agreed sequence. Optionally, a sorting sequence of the N groups of CSI in the feedback message is the same as a sorting sequence of the N pieces of associated CSI measurement configuration information in the CSI process.

When the terminal receives the first CSI reporting mode indication information, in some other embodiments, if the base station configures N CSI processes for the terminal, the terminal has one group of CSI corresponding to each piece of CSI measurement configuration information in one feedback message and feeds back the feedback message, and the N groups of CSI in the feedback message are sorted in a specified sequence. The specified sequence may be a pre-agreed sequence. Optionally, a sorting sequence of the N groups of CSI in the feedback message is the same as a sorting sequence of the N CSI processes. In some other embodiments, if the base station configures N CSI processes for the terminal, the terminal may have one group of CSI corresponding to each piece of CSI measurement configuration information in N feedback messages and feeds back the N feedback messages, and each feedback message includes one group of CSI.

If the CSI reporting mode indication information received by the terminal is the second CSI reporting mode indication information, the terminal performs, according to the second CSI reporting mode indication information, joint CSI measurement that is based on transmit diversity-related transmission (for example, coordinated multipoint diversity transmission) to obtain one group of CSI, and feeds back the group of CSI. The group of CSI includes a PMI corresponding to each piece of CSI measurement configuration information (an RI corresponding to the PMI is 1) and a joint CQI corresponding to the N pieces of associated CSI measurement configuration information. Certainly, the terminal may alternatively perform, based on the received second CSI reporting mode indication information and transmission mode indication information (the transmission mode indication information is used to instruct to perform transmit diversity-related transmission, for example, coordinated multipoint diversity transmission), joint CSI measurement that is based on transmit diversity-related transmission (for example, coordinated multipoint diversity transmission).

Further, the terminal may perform CSI feedback according to the second CSI reporting mode indication information in any one of the following manners:

Manner 1: The base station configures one CSI process for the terminal, and the terminal feeds back one feedback message. The feedback message includes the joint CQI and PMIs corresponding to CSI-RSs indicated by the N pieces of associated CSI measurement configuration information, and the joint CQI and the PMIs corresponding to the CSI-RSs indicated by the N pieces of associated CSI measurement configuration information are sorted in a specified sequence. The specified sequence may be a pre-agreed sequence. Optionally, a sorting sequence of the PMIs corresponding to the CSI-RSs indicated by the N pieces of associated CSI measurement configuration information in the feedback message is the same as a sorting sequence of the N pieces of associated CSI measurement configuration information in the CSI process.

A PMI corresponding to a CSI-RS indicated by CSI measurement configuration information is obtained by measuring, based on a CSI-RS resource indicated by the CSI measurement configuration information, a CSI-RS carried on the corresponding CSI-RS resource.

Manner 2: The base station configures N CSI processes for the terminal, and the terminal feeds back one feedback message. The feedback message includes the joint CQI and PMIs corresponding to CSI-RSs indicated by the N pieces of associated CSI measurement configuration information, and the joint CQI and the PMIs corresponding to the CSI-RSs indicated by the N pieces of associated CSI measurement configuration information are sorted in a specified sequence.

Manner 3: The base station configures N CSI processes for the terminal, and the terminal feeds back N feedback messages. Each feedback message is corresponding to one CSI process and includes the joint CQI and a PMI corresponding to one CSI process.

Manner 4: The base station configures N CSI processes for the terminal, and the terminal feeds back N feedback messages. Each feedback message is corresponding to one CSI process and includes a PMI corresponding to one CSI process, and one of the N feedback messages further includes the joint CQI. A feedback message for feeding back the joint CQI is agreed in advance (for example, the feedback message may be notified by the base station in advance). In another example, the terminal may alternatively notify the base station of the feedback message for feeding back the joint CQI. This may be applicable to a scenario in which the base station does not notify the terminal of the message for feeding back the joint CQI.

Manner 5: The base station configures N CSI processes for the terminal, and the terminal feeds back N+1 feedback messages. Each of the N feedback messages is corresponding to one CSI process and includes a PMI corresponding to one CSI process, and the other feedback message includes the joint CQI. The N+1 feedback messages may be sent in a specified sequence. The specified sequence may be pre-agreed. For example, the base station may notify the terminal of the sequence, or the base station and the terminal may preconfigure the sequence.

Currently, an LTE protocol supports only a transmit diversity on which precoding is not performed, and does not support transmission using two or more beam transmit diversities. For a TM9 (transmission mode 9) terminal, when a higher layer does not configure the terminal to PMI and/or RI reporting, it is specified that a CRS is used to perform CSI measurement. If the higher layer configures the terminal to perform PMI and RI reporting, a CSI-RS is used to perform CSI measurement. This embodiment of the present invention provides the following solution, so that the terminal can be allowed to perform measurement based on a CSI-RS when the terminal is not configured to perform PMI and RI reporting.

Further, when the terminal receives the second CSI reporting mode indication information, if the terminal is not configured to perform PMI and RI feedback, the base station sends measurement indication information to the terminal. The measurement indication information is used to instruct the terminal to perform CSI measurement based on a CSI-RS or a CRS (cell-specific reference signal). Further, in this embodiment of the present invention, the base station or the higher layer is allowed to instruct, in different cases or at different times, the terminal to perform CSI measurement based on a CSI-RS or perform CSI measurement based on a CRS.

In specific implementation, when a serving cell and a coordinated cell that are of the terminal are located in different base stations, the terminal may feed back determined CSI to a base station in which the serving cell is located, and the base station in which the serving cell is located sends, by using an X2 transceiver, the CSI to a base station in which the coordinated cell is located. The X2 transceiver is a transceiver between base stations. Optionally, to reduce an amount of data transmitted by the X2 transceiver, the base station in which the serving cell is located may feed back only CSI of the coordinated cell to the coordinated cell, for example, feed back a PMI and a CQI of the coordinated cell to the coordinated cell.

Alternatively, the terminal may separately feed back the determined CSI to the base station in which the serving cell is located and the base station in which the coordinated cell is located. Optionally, the terminal may feed back CSI of the serving cell to the base station in which the serving cell is located, and feed back the CSI of the coordinated cell to the base station in which the coordinated cell is located. For example, the terminal feeds back channel state information (a PMI1 and a CQI1) of the serving cell to the base station in which the serving cell is located, and feeds back channel state information (a PMI2 and a CQI2) of the coordinated cell to the base station in which the coordinated cell is located.

The terminal may feed back CSI according to a specified period or a specified time, or according to another configured feedback rule.

Optionally, the base station of the serving cell may pre-send, by using an X2 transceiver, a notification message to the base station in which the coordinated cell is located, so as to notify the coordinated cell of a transmission resource used by the terminal to feed back the CSI, so that the coordinated cell receives, on the resource, the CSI fed back by the terminal. Optionally, the base station of the serving cell may send, ahead of a specific quantity of TTIs (transmission time interval), the notification message to the base station in which the coordinated cell is located, so as to ensure that when the terminal feeds back the CSI, the base station of the coordinated cell can receive, on the corresponding resource, the CSI fed back by the terminal. This manner can alleviate impact of a backhaul link delay on CSI measurement precision, and is applicable to non-ideal backhaul link transmission.

Step 303: The base station receives CSI fed back after the terminal performs joint CSI measurement according to the CSI reporting mode indication information.

On the basis of the foregoing embodiment, to be more compatible with the prior art and better improve system flexibility, optionally, in some other embodiments, the base station may instruct the terminal to perform CSI measurement and feedback in a specific manner, that is, instruct the terminal to use a CSI measurement method provided in this embodiment of the present invention or a conventional CSI measurement method.

In some embodiments, in a process in which the terminal performs joint CSI measurement according to the first CSI reporting mode indication information, the terminal may first determine a PMI corresponding to a CSI-RS indicated by each of the N pieces of associated CSI measurement configuration information, and determine, based on a downlink channel and interference that are corresponding to each of the N pieces of associated CSI measurement configuration information, a CQI corresponding to each of the N pieces of associated CSI measurement configuration information. A downlink channel and interference that are corresponding to one piece of CSI measurement configuration information are obtained based on the PMIs corresponding to the CSI-RSs indicated by the N pieces of associated CSI measurement configuration information. The interference corresponding to the CSI measurement configuration information includes interference outside antenna ports specified by the N pieces of associated CSI measurement configuration information, and interference obtained after corresponding PMI processing is performed on one piece of CSI measurement configuration information other than the CSI measurement configuration information.

Figure 4:
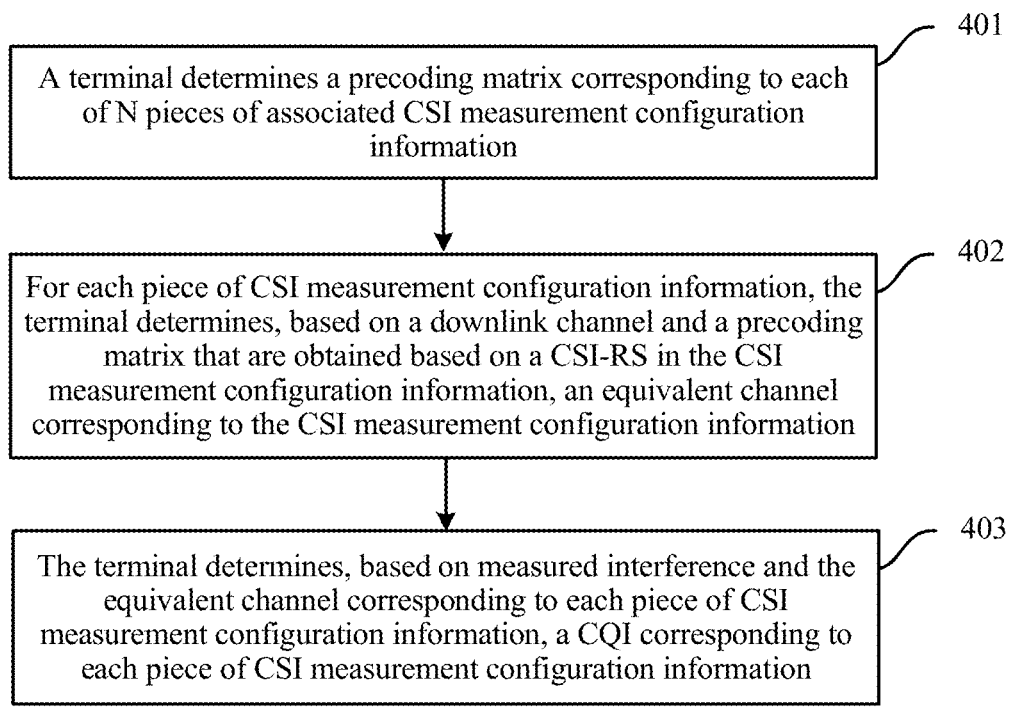
FIG. 4 is a joint CSI measurement procedure that is based on coordinated multipoint multi-stream transmission according to an embodiment of the present invention.

With reference to FIG. 4, the following describes in detail a process in which joint CSI measurement that is based on coordinated multipoint multi-stream transmission is performed based on first CSI reporting mode indication information.

In some embodiments, a process in which a terminal performs, according to the first CSI reporting mode indication information, joint CSI measurement that is based on coordinated multipoint multi-stream transmission may be shown in FIG. 4, and includes the following steps.

Step 401: The terminal determines a precoding matrix corresponding to each of N pieces of associated CSI measurement configuration information.

In a coordinated multipoint transmission/reception scenario, a plurality of cells may transmit data to the terminal in a coordinated or collaborative manner. The plurality of cells that transmit data to the terminal in the coordinated manner form a coordination set of the terminal. In specific implementation of this embodiment of the present invention, the base station configures CSI measurement configuration information for the terminal based on each cell in the coordination set, and the terminal determines a corresponding precoding matrix for each piece of CSI measurement configuration information configured by the base station.

A current precoding matrix determining method used in single-cell measurement may be used when a precoding matrix of a cell is determined based on a measured channel matrix of the cell. Optionally, on the basis of this, mutual impact between cells is further considered and a more optimized precoding matrix determining method is provided in this embodiment of the present invention.

In an optimized precoding matrix determining example, the terminal measures a CSI-RS of a cell corresponding to each piece of CSI measurement configuration information to obtain a downlink channel matrix of each cell. For N cells (or coordinated transmission points) corresponding to N pieces of associated CSI measurement configuration information, the terminal selects a precoding matrix from a preconfigured precoding matrix set (that is, a codebook) for each cell based on the measured downlink channel matrix of the corresponding cell and based on an interference minimization criterion. The interference minimization criterion is used, so that interference that is between the coordinated transmission points and that is calculated based on the selected precoding matrix is minimum.

In another optimized precoding matrix determining example, the terminal measures a CSI-RS of a cell corresponding to each piece of CSI measurement configuration information to obtain a downlink channel matrix of each cell. The terminal calculates a sum of received SINRs of coordinated points, and selects a precoding matrix from a preconfigured precoding matrix set (that is, a codebook) for each cell based on an SINR maximization criterion. The SINR maximization criterion is used, so that a total SINR calculated based on the selected precoding matrix of each cell (that is, a sum of SINRs that are received by the terminal and that are of signals of cells in the coordination set) is maximum.

A precoding matrix that is determined only for a single cell may cause strong interference to a data stream of the coordinated cell. Therefore, a precoding matrix of a cell with optimal coordinated transmission performance can be selected by using the foregoing method.

Step 402: For each of the N pieces of associated CSI measurement configuration information, the terminal determines, based on a downlink channel and a precoding matrix that are obtained based on a CSI-RS in the CSI measurement configuration information, an equivalent channel corresponding to the CSI measurement configuration information.

The "equivalent channel" herein is a channel obtained after an operation is performed on a measured downlink channel based on the precoding matrix determined in step 401. Because the base station performs precoding processing when performing downlink transmission, the "equivalent channel" obtained after the terminal processes the measured channel by using the precoding matrix is closer to an actual channel than the measured channel.

Step 402 may be specifically implemented by using different methods. This embodiment of the present invention provides the following optional methods.

A first cell is used as an example. The first cell is any cell in the N cells corresponding to the N pieces of associated CSI measurement configuration information, and the terminal determines an equivalent channel between the terminal and the first cell based on a measured downlink channel between the terminal and the first cell and based on a precoding matrix of the first cell.

For example, if a matrix of a downlink channel that is measured by the terminal and that is between the terminal and a cell 1 is represented by H1, and a determined precoding matrix of the cell 1 is represented by W1, an equivalent channel between the terminal and the cell 1 is $H_1'=H_1 \times W_1$; if a matrix of a downlink channel that is measured by the terminal and that is between the terminal and a cell 2 is represented by H2, and a determined precoding matrix of the cell 2 is represented by W2, an equivalent channel between the terminal and the cell 2 is $H_2'=H_2 \times W_2$.

The foregoing method is applicable to a case in which cells independently perform precoding processing and coordinately transmit a plurality of data streams to a terminal, for example, a case in which each cell performs data transmission in a coordinated multipoint multi-stream transmission manner.

Step 403: The terminal determines, based on measured interference and the equivalent channel corresponding to each of the N pieces of associated CSI measurement configuration information, a CQI corresponding to each of the N pieces of associated CSI measurement configuration information.

In a coordinated multipoint multi-stream transmission manner, CSI between the terminal and a serving cell and CSI between the terminal and a coordinated cell may be determined by using one of the following two solutions (a solution 1 and a solution 2).

Optionally, a system may agree to use only the solution 1 or the solution 2. In some other embodiments, the system allows to use the solution 1 and the solution 2. In this case, the terminal may be instructed to use the solution 1 or the solution 2. Specifically, indication information may be sent to notify the terminal of whether to use the solution 1 or the solution 2. Optionally, the indication information may be sent by using higher layer signaling.

The following separately describes the solution 1 and the solution 2 in detail.

Solution 1

First CSI measurement configuration information is used as an example. The first CSI measurement configuration information is any one of the N pieces of associated CSI measurement configuration information, and interference that is corresponding to the first CSI measurement configuration information and that is measured by the terminal includes interference outside an antenna port specified by the first CSI measurement configuration information. CSI determined by the terminal may include a CQI corresponding to each piece of CSI measurement configuration information. A CQI corresponding to the first CSI measurement configuration information may be calculated based on interference corresponding to the first CSI measurement configuration information and an equivalent channel corresponding to the first CSI measurement configuration information. For example, the first CSI measurement configuration information is a CSI-RS resource configured for a cell 1 in a coordination set. The coordination set further includes a cell 2. In this case, interference corresponding to the cell 1 (that is, interference to the cell 1) includes interference outside an antenna port specified by the CSI-RS resource configured for the cell 1, for example, interference from the cell 2 and interference outside the coordination set.

Optionally, the measured interference may be processed based on a precoding matrix to obtain "equivalent interference", so that a CQI can be calculated based on the "equivalent interference". Because the base station performs precoding processing when performing downlink transmission, an "equivalent interference" matrix is closer to an actual interference matrix than a measured interference matrix, so that CSI measurement precision can be improved. The foregoing scenario is still used as an example. The terminal may determine equivalent interference to the cell 1 based on measured interference outside the cell 1, a downlink channel of the cell 2, and a precoding matrix of the cell 2. The terminal may determine equivalent interference to the cell 2 based on interference outside the cell 2, a downlink channel of the cell 1, and a precoding matrix of the cell 1.

Specifically, in a scenario in which the serving cell and the coordinated cell use a coordinated multipoint multi-stream transmission manner, the terminal may determine equivalent interference to the serving cell based on measured interference outside an antenna port specified by a CSI-RS resource of the serving cell and an equivalent channel of the coordinated cell (the equivalent channel of the coordinated cell is calculated based on a downlink channel of the coordinated cell and a precoding matrix of the coordinated cell), and determine, based on an equivalent channel of the serving cell and the equivalent interference to the serving cell, a CQI corresponding to the serving cell. Likewise, the terminal may determine equivalent interference to the coordinated cell based on measured interference outside an antenna port specified by a CSI-RS resource of the coordinated cell and an equivalent channel of the serving cell (the equivalent channel of the serving cell is calculated based on a downlink channel of the serving cell and a precoding matrix of the serving cell), and determine, based on an equivalent channel of the coordinated cell and the equivalent interference to the coordinated cell, a CQI corresponding to the coordinated cell.

Solution 2

First CSI measurement configuration information is used as an example. The first CSI measurement configuration information is any one of the N pieces of associated CSI measurement configuration information, and interference that is corresponding to the first CSI measurement configuration information and that is measured by the terminal includes interference outside antenna ports specified by the N pieces of associated CSI measurement configuration information, that is, interference outside a coordination set. CSI determined by the terminal may include a CQI corresponding to each piece of CSI measurement configuration information.

Optionally, equivalent channel information corresponding to second CSI measurement configuration information (that is, CSI measurement configuration information other than the first CSI measurement configuration information) may act as interference corresponding to the first CSI measurement configuration information and may be considered together with the measured interference to obtain equivalent interference corresponding to the first CSI measurement configuration information, so that a CQI can be calculated based on the equivalent interference. For example, the first CSI measurement configuration information is a CSI-RS resource configured for a cell 1 in the coordination set, and the coordination set further includes a cell 2. That is, an equivalent channel of the cell 2 may act as interference to the cell 1 when equivalent interference to the cell 1 is being calculated, and the equivalent interference to the cell 1 is calculated with reference to the measured interference outside the coordination set. Because the base station performs precoding processing when performing downlink transmission, the foregoing equivalent interference is closer to actual interference than the measured interference, so that CSI measurement precision can be improved.

Specifically, the terminal may determine, based on the measured interference and an equivalent channel corresponding to CSI measurement configuration information other than the first CSI measurement configuration information, the equivalent interference corresponding to the first CSI measurement configuration information, and determine, based on the equivalent channel and the equivalent interference that are corresponding to the first CSI measurement configuration information, a CQI corresponding to the first CSI measurement configuration information.

The foregoing scenario is still used as an example. The terminal may determine, based on the equivalent channel of the cell 2 and the measured interference (that is, the interference outside the coordination set), the equivalent interference to the cell 1, and determine, based on an equivalent channel of the cell 1 and the equivalent interference to the cell 1, a CQI corresponding to the cell 1.

Compared with the solution 1, the solution 2 only requires measurement of the interference outside the coordination set. Therefore, only one interference measurement resource (IMR for short) may be configured to measure the interference outside the coordinating set, so that physical resource overheads for measurement are reduced in comparison with that in the solution 1.

In some embodiments, in a process in which the terminal performs joint CSI measurement according to the second CSI reporting mode indication information, the terminal may first determine a PMI corresponding to a CSI-RS indicated by each of the N pieces of associated CSI measurement configuration information, and then determine, based on downlink channels and interference that are corresponding to the N pieces of associated CSI measurement configuration information and based on a transmit diversity-related transmission mode, a joint CQI corresponding to the N pieces of associated CSI measurement configuration information. A downlink channel and interference that are corresponding to one piece of CSI measurement configuration information are obtained based on PMIs corresponding to CSI-RSs indicated by the N pieces of associated CSI measurement configuration information, and the interference corresponding to the CSI measurement configuration information includes interference outside antenna ports specified by the N pieces of associated CSI measurement configuration information.

Figure 5:
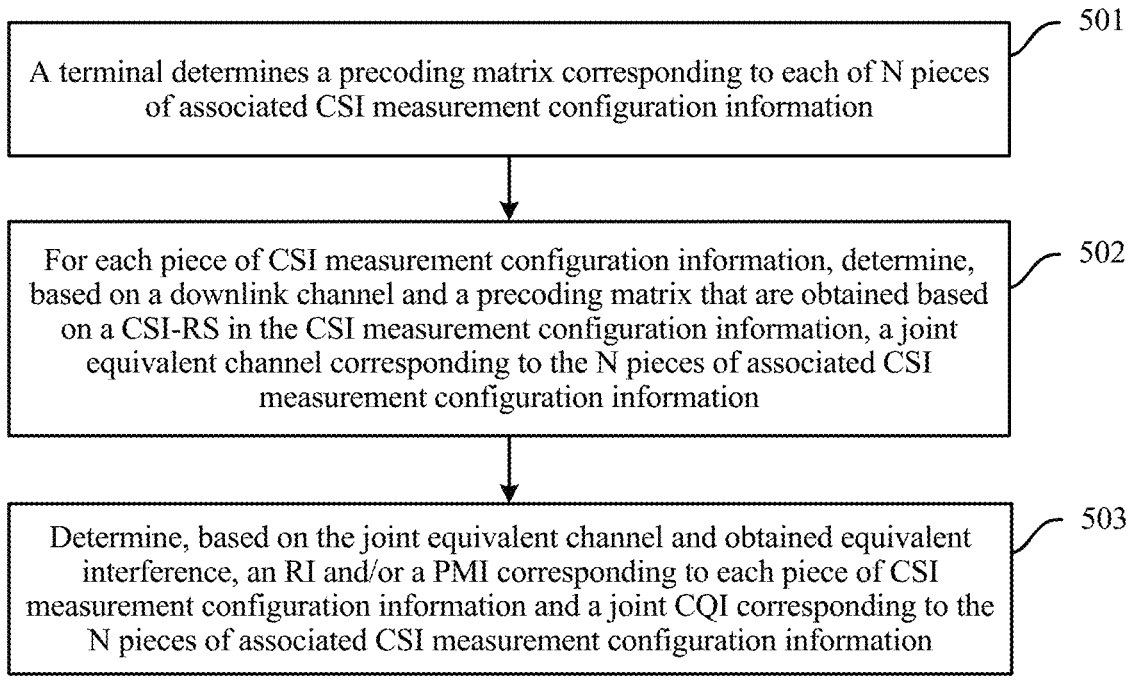
FIG. 5 is a joint CSI measurement procedure that is based on coordinated multipoint multi-stream transmission according to an embodiment of the present invention.

With reference to FIG. 5, the following describes in detail a process in which joint CSI measurement that is based on coordinated multipoint diversity transmission is performed based on second CSI reporting mode indication information.

In some embodiments, a process in which a terminal performs, according to the second CSI reporting mode indication information, joint CSI measurement that is based on coordinated multipoint diversity transmission may be shown in FIG. 5, and includes the following steps.

Step 501: The terminal determines a precoding matrix corresponding to each of N pieces of associated CSI measurement configuration information.

A specific implementation of this step may be the same as that of step 401, and is not repeated herein.

Step 502: For each of the N pieces of associated CSI measurement configuration information, determine, based on a downlink channel and a precoding matrix that are obtained based on a CSI-RS in the CSI measurement configuration information, a joint equivalent channel corresponding to the N pieces of associated CSI measurement configuration information.

Optionally, in step 502, for each of the N pieces of associated CSI measurement configuration information, an equivalent channel corresponding to the CSI measurement configuration information may be determined based on the downlink channel and the precoding matrix that are obtained based on the CSI-RS in the CSI measurement configuration information, and the joint equivalent channel corresponding to the N pieces of associated CSI measurement configuration information is determined based on the equivalent channel corresponding to each piece of CSI measurement configuration information.

The "equivalent channel" herein is a channel obtained after an operation is performed on a measured downlink channel based on the precoding matrix determined in step 501. Because a base station performs precoding processing when performing downlink transmission, the "equivalent channel" obtained after the terminal processes the measured channel by using the precoding matrix is closer to an actual channel than the measured channel.

A method for determining an equivalent channel corresponding to CSI measurement configuration information may be the same as the method described in step 402, and is not repeated herein.

For example, if a matrix of a downlink channel that is measured by the terminal and that is corresponding to first CSI measurement configuration information is represented by H1, and a determined precoding matrix corresponding to the first CSI measurement configuration information is represented by W1, an equivalent channel corresponding to the first CSI measurement configuration information is $H_1'=H_1 \times W_1$; if a matrix of a downlink channel that is measured by the terminal and that is corresponding to second CSI measurement configuration information is represented by H2, and a determined precoding matrix corresponding to the second CSI measurement configuration information is represented by W2, an equivalent channel corresponding to the second CSI measurement configuration information is $H_2'=H_2 \times W_2$. The terminal obtains a joint equivalent channel H' based on $H_1'$ and $H_2'$ by using an SFBC-based equivalent channel generation method.

Two antennas are used as an example. If there are two transmit antennas on a base station side, the following equation is met:

$$[H_1' \ H_2'] = \begin{bmatrix} h_{11} & h_{21} \\ h_{12} & h_{22} \end{bmatrix}, \quad (1)$$

where $h_{ij}$ represents a channel coefficient of an $i^{th}$ transmit antenna to a $j^{th}$ receive antenna. In this example, i=1, 2, and j=1, 2.

The equivalent channel H' may be represented by:

$$H' = \begin{bmatrix} h_{11} & h_{21} \\ h_{21}^* & -h_{11}^* \\ h_{12} & h_{22} \\ h_{22}^* & -h_{12}^* \end{bmatrix}, \quad (2)$$

where $h_{ij}^*$ represents a conjugate of $h_{ij}$. In this example, i=1, 2, and j=1, 2.

When a quantity of antennas on the base station side increases, only one stream is generated through precoding, and the SFBC-based equivalent channel generation method may be directly extended by using the foregoing method.

Step 503: Determine, based on the joint equivalent channel and obtained equivalent interference, an RI and/or a PMI corresponding to each piece of CSI measurement configuration information and a joint CQI corresponding to the N pieces of associated CSI measurement configuration information.

Measured interference corresponding to each of the N pieces of associated CSI measurement configuration information may include interference outside antenna ports specified by the N pieces of associated CSI measurement configuration information. Correspondingly, a process in which the joint CQI corresponding to the N pieces of associated CSI measurement configuration information is determined based on the joint equivalent channel and the obtained equivalent interference may include: performing multipoint diversity equivalent processing on the interference outside the antenna ports specified by the N pieces of associated CSI measurement configuration information, to obtain the equivalent interference; and determining, based on the joint equivalent channel and the equivalent interference, the joint CQI corresponding to the N pieces of associated CSI measurement configuration information.

To further improve accuracy of a CQI, optionally, when the joint CQI is being calculated, SFBC equivalent processing may be first performed on interference outside a coordination set to obtain the equivalent interference (an SFBC equivalent processing method may be a method in the prior art, or a method defined in a future communications standard, or another method, and this is not limited in this embodiment of the present invention), and then the joint CQI that is corresponding to each piece of CSI measurement configuration information and that is of the terminal is determined based on the calculated joint equivalent channel and the obtained equivalent interference.

Specific scenarios of coordinated multipoint multi-stream transmission and SFBC coordinated transmission are separately used as examples below to describe in detail this embodiment of the present invention.

Scenario 1: In a coordinated multipoint multi-stream transmission scenario, the foregoing solution 1 of coordinated multipoint multi-stream transmission is used.

In the scenario 1, a cell 1 and a cell 2 transmit data to a terminal A in a coordinated multipoint multi-stream transmission manner. The cell 1 is a serving cell of the terminal A, and the cell 2 is a coordinated cell.

Figure 6A:
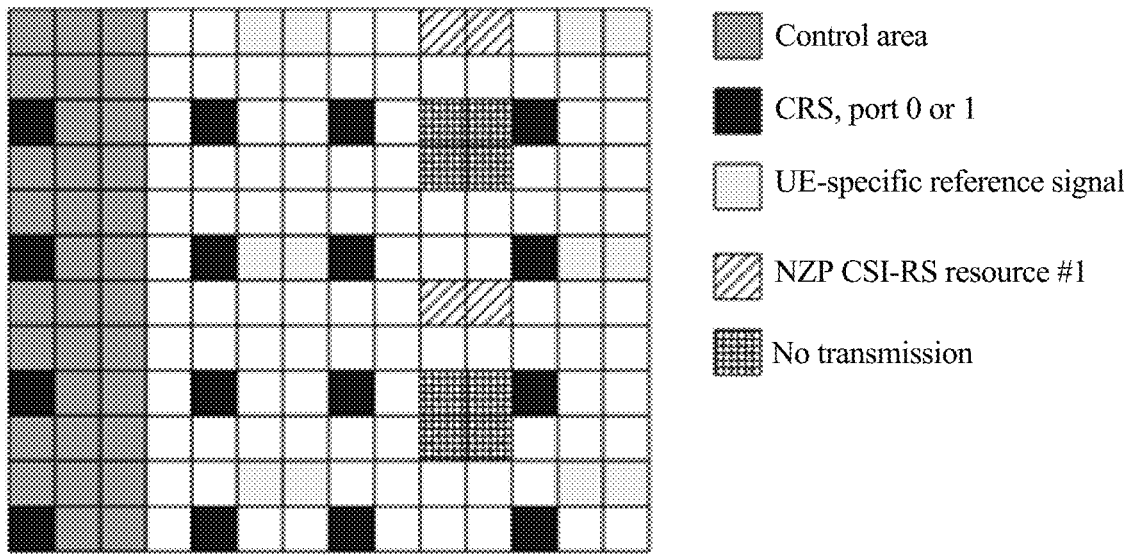
FIG. 6a, FIG. 6b, and FIG. 6c are schematic diagrams of CSI process configuration in a scenario 1 according to an embodiment of the present invention.
Figure 6B:
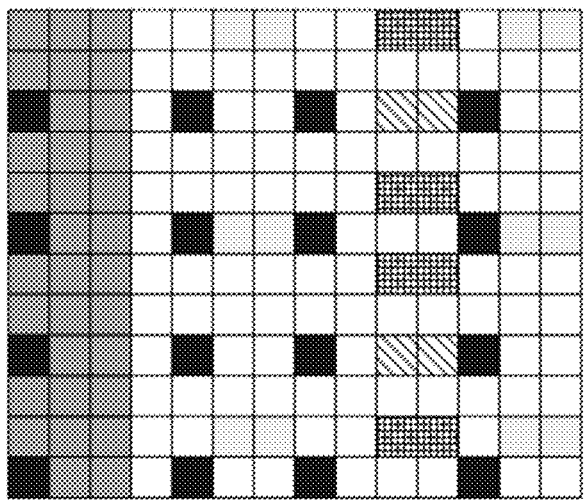
Figure 6C:
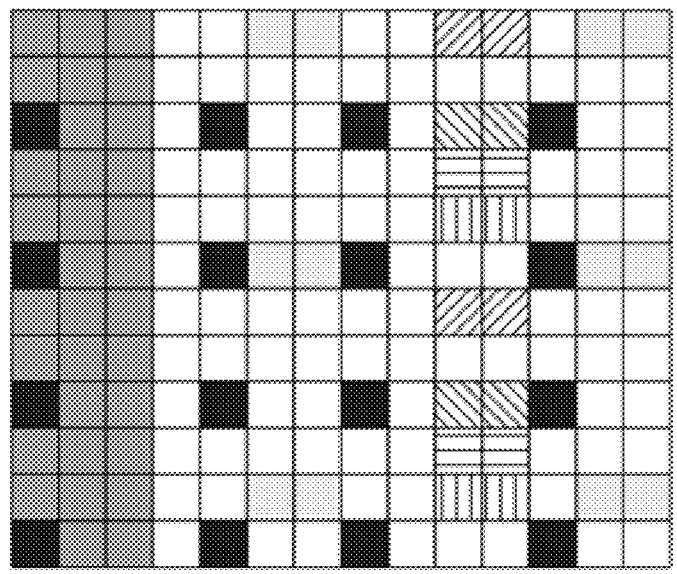

As shown in FIG. 6a, FIG. 6b, and FIG. 6c, a base station of the cell 1 configures two CSI processes: a CSI process #1 and a CSI process #2 for the terminal. FIG. 6a, FIG. 6b, and FIG. 6c show transmission resource mapping patterns in two consecutive PRBs (physical resource block). The two PRBs include two timeslots and 14 symbols in time domain and 12 subcarriers in frequency domain.

The CSI process #1 includes an NZP CSI-RS resource #1 and an IMR #1. The NZP CSI-RS resource #1 represents a non-zero power CSI-RS resource numbered 1, and the IMR #1 represents an interference measurement resource numbered 1. The terminal may measure interference information of a cell other than the cell 1 based on the IMR #1.

The CSI process #2 includes an NZP CSI-RS resource #2 and an IMR #2. The NZP CSI-RS resource #2 represents a non-zero power CSI-RS resource numbered 2, and the IMR #2 represents an interference measurement resource numbered 2. The terminal may measure interference information of a cell other than the cell 2 based on the IMR #2.

The base station of the cell 1 may transmit a reference signal and data based on a reference signal pattern shown in FIG. 6a. A base station of the cell 2 may transmit a reference signal and data based on a reference signal pattern shown in FIG. 6b.

As shown in FIG. 6a, FIG. 6b, and FIG. 6c, on an RE corresponding to the NZP CSI-RS resource #1, the base station of the cell 1 transmits an NZP CSI-RS and the base station of the cell 2 is silent. On an RE corresponding to the NZP CSI-RS resource #2, the base station of the cell 1 is silent and the base station of the cell 2 transmits an NZP CSI-RS. The cell 1 sends a ZP CSI-RS (zero-power CSI-RS) on an RE corresponding to the IMR #1, and the cell 2 sends a ZP CSI-RS on an RE corresponding to the IMR #2.

The terminal A performs downlink channel measurement and interference measurement based on the CSI process #1 and the CSI process #2 to obtain a downlink channel matrix H1 between the terminal A and the cell 1 and a downlink channel matrix H2 between the terminal A and the cell 2. The terminal determines a PMI1 of the cell 1 and a PMI2 of the cell 2 based on a downlink channel matrix and a codebook and based on an interference minimization criterion or an SINR maximization criterion. A precoding matrix corresponding to the PMI1 is represented by W1, and a precoding matrix corresponding to the PMI2 is represented by W2. A method for determining a precoding matrix based on the interference minimization criterion or the SINR maximization criterion may be that described in the foregoing embodiment, and is not repeated herein.

An interference matrix measured by the terminal A on a corresponding RE based on the IMR #1 is represented by I1, and an interference matrix measured by the terminal A on a corresponding RE based on the IMR #2 is represented by I2.

Based on the foregoing measurement result, the terminal A calculates an equivalent channel $H_1'$ between the terminal A and the cell 1 and an equivalent channel $H_2'$ between the terminal A and the cell 2, and calculates equivalent interference $I_1'$ to the cell 1 and equivalent interference $I_2'$ to the cell 2.

The terminal A calculates a CQI1 of the cell 1 based on the calculated $H_1'$ and $I_1'$, and calculates a CQI2 of the cell 2 based on the calculated $H_2'$ and $I_2'$.

The terminal A feeds back calculated CSI (including the PMI1 and the CQI1) of the cell 1 to the base station of the cell 1, and feeds back calculated CSI (including the PMI2 and the CQI2) of the cell 2 to the base station of the cell 2. In another embodiment, the terminal A may send the calculated CSI of the cell 1 and the calculated CSI of the cell 2 to a serving base station of the terminal A, and the serving base station forwards the CSI to a corresponding base station.

A CSI measurement method in conventional CoMP transmission is compared with the CSI measurement method in the scenario 1. In a conventional CoMP transmission technology, when neighboring cell interference is measured, a result of the measurement is obtained without considering a precoding factor. In actual transmission, a neighboring cell base station performs precoding before transmission. Therefore, interference measurement using the conventional CoMP transmission technology is not accurate enough, and a relatively large error arises. In comparison with the conventional CoMP transmission technology, in the foregoing embodiment of the present invention, interference generated after the neighboring cell base station performs precoding is considered in CSI measurement, so that measured interference is more authentic and accurate. This improves accuracy and efficiency of scheduling and determining by the base station, and ensures transmission performance. In addition, although base stations independently perform precoding, after the terminal measures channel information of the serving cell and the coordinated cell, the terminal may feed back a global optimal PMI through joint optimized search, so that interference between cells is reduced to some extent, thereby improving system performance. The foregoing method is particularly applicable to a scenario in which each base station cannot learn of global channel information because a backhaul link is limited.

In the foregoing embodiment, CSI reporting with higher precision is implemented with a shorter delay and lower feedback overheads, so that the base station can accurately determine an appropriate MCS, thereby improving system transmission performance.

An example in which two cells perform coordinated multipoint multi-stream transmission is used to describe the foregoing embodiment. For a scenario in which a plurality of cells (more than two cells) perform coordinated multipoint multi-stream transmission, a channel state measurement and feedback method may be implemented by directly extending the foregoing solution.

Scenario 2: In a coordinated multipoint multi-stream transmission scenario, the foregoing solution 2 of coordinated multipoint multi-stream transmission is used.

In the scenario 2, a cell 1 and a cell 2 transmit data to a terminal A in a coordinated multipoint multi-stream transmission manner. The cell 1 is a serving cell of the terminal A, and the cell 2 is a coordinated cell.

Figure 7A:
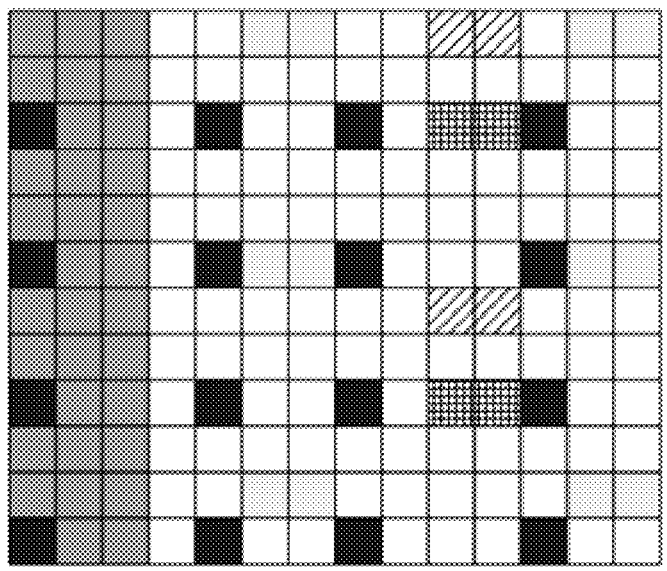
FIG. 7a, FIG. 7b, and FIG. 7c are schematic diagrams of CSI process configuration in a scenario 2 according to an embodiment of the present invention.
Figure 7B:
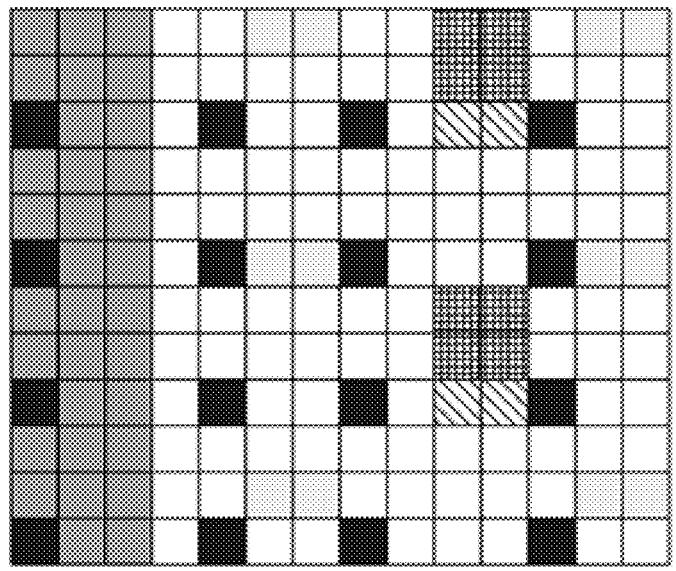
Figure 7C:
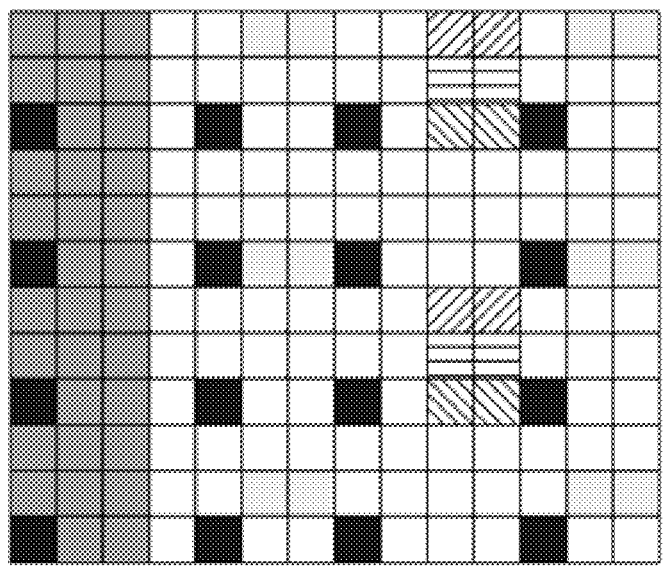

As shown in FIG. 7a, FIG. 7b, and FIG. 7c, a base station of the cell 1 configures two CSI processes: a CSI process #1 and a CSI process #2 for the terminal. FIG. 7a, FIG. 7b, and FIG. 7c show transmission resource mapping patterns in two consecutive PRBs. The two PRBs include two timeslots and 14 symbols in time domain and 12 subcarriers in frequency domain.

The CSI process #1 includes an NZP CSI-RS resource #1 and an IMR #1. The NZP CSI-RS resource #1 represents a non-zero power CSI-RS resource numbered 1, and the IMR #1 represents an interference measurement resource numbered 1. The terminal may measure interference information of a cell outside the coordination set based on the IMR #1.

The CSI process #2 includes an NZP CSI-RS resource #2. The NZP CSI-RS resource #2 represents a non-zero power CSI-RS resource numbered 2.

The base station of the cell 1 may transmit a reference signal and data based on a reference signal pattern shown in FIG. 7a. A base station of the cell 2 may transmit a reference signal and data based on a reference signal pattern shown in FIG. 7b.

As shown in FIG. 7a, FIG. 7b, and FIG. 7c, on an RE corresponding to the NZP CSI-RS resource #1, the base station of the cell 1 transmits an NZP CSI-RS and the base station of the cell 2 is silent. On an RE corresponding to the NZP CSI-RS resource #2, the base station of the cell 1 is silent and the base station of the cell 2 transmits an NZP CSI-RS. On an RE corresponding to the IMR #1, the cell 1 and the cell 2 transmit a ZP CSI-RS.

The terminal A performs downlink channel measurement and interference measurement based on the CSI process #1 and the CSI process #2 to obtain a downlink channel matrix H1 between the terminal A and the cell 1 and a downlink channel matrix H2 between the terminal A and the cell 2. The terminal determines a PMI1 of the cell 1 and a PMI2 of the cell 2 based on a downlink channel matrix and a codebook. A precoding matrix corresponding to the PMI1 is represented by W1, and a precoding matrix corresponding to the PMI2 is represented by W2.

An interference matrix measured by the terminal A on a corresponding RE based on the IMR #1 is represented by $I_0$.

Based on the foregoing measurement result, the terminal A calculates an equivalent channel $H_1'$ between the terminal A and the cell 1 and an equivalent channel $H_2'$ between the terminal A and the cell 2, and obtains equivalent interference $I_1$ to the cell 1 and equivalent interference $I_2$ to the cell 2 based on $H_1'$, $H_2'$, and $I_0$.

The terminal A calculates a CQI1 of the cell 1 based on $H_1'$ and $I_1$, and calculates a CQI2 of the cell 2 based on $H_2'$ and $I_2$.

The terminal A feeds back calculated CSI (including an RI1, the PMI1, and the CQI1) of the cell 1 to the base station of the cell 1, and feeds back calculated CSI (including an RI2, the PMI2, and the CQI2) of the cell 2 to the base station of the cell 2. In another embodiment, the terminal A may send the calculated CSI of the cell 1 and the calculated CSI of the cell 2 to a serving base station of the terminal A, and the serving base station forwards the CSI to a corresponding base station.

Compared with the CSI measurement method in the scenario 1, the CSI measurement method in the scenario 2 can reduce a quantity of configured IMRs, thereby reducing measurement resource overheads.

In the foregoing embodiment, CSI reporting with higher precision is implemented with a shorter delay and lower feedback overheads, so that the base station can accurately determine an appropriate MCS, thereby improving system transmission performance.

An example in which two cells perform coordinated multipoint multi-stream transmission is used to describe the foregoing embodiment. For a scenario in which a plurality of cells (more than two cells) perform coordinated multipoint multi-stream transmission, a channel state measurement and feedback method may be implemented by directly extending the foregoing solution.

Scenario 3: Coordinated Multipoint Diversity Transmission Scenario

In the scenario 3, a cell 1 and a cell 2 transmit data to a terminal A in a coordinated multipoint diversity transmission manner. The cell 1 is a serving cell of the terminal A, and the cell 2 is a coordinated cell.

Figure 8A:
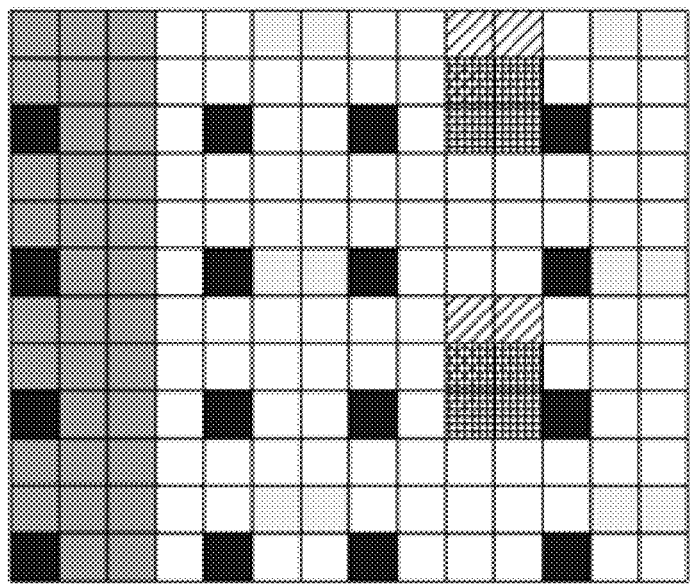
FIG. 8a, FIG. 8b, and FIG. 8c are schematic diagrams of CSI process configuration in a scenario 3 according to an embodiment of the present invention.
Figure 8B:
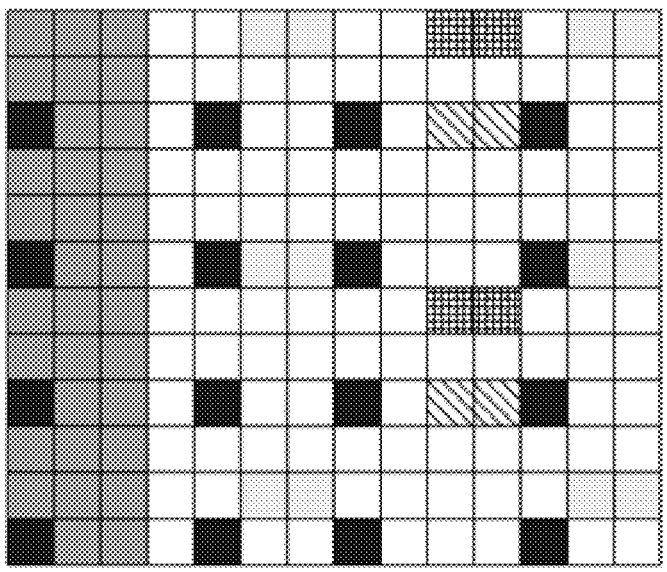
Figure 8C:
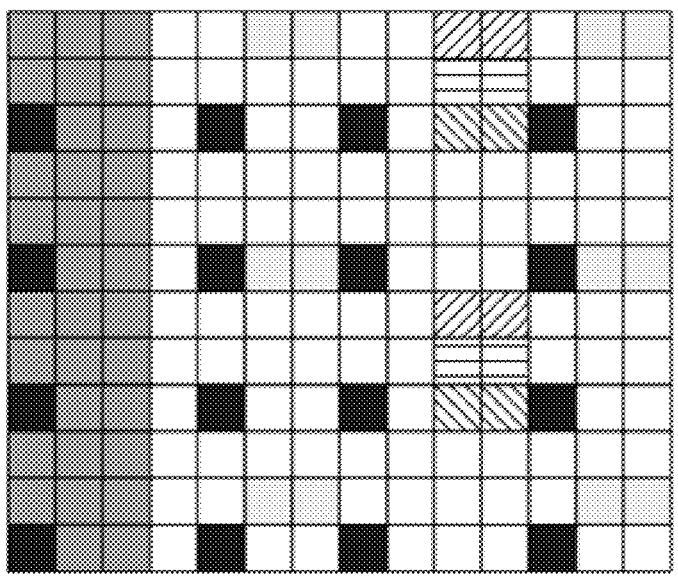

As shown in FIG. 8a, FIG. 8b, and FIG. 8c, a base station of the cell 1 configures two CSI processes: a CSI process #1 and a CSI process #2 for the terminal. FIG. 8a, FIG. 8b, and FIG. 8c show transmission resource mapping patterns in two consecutive PRBs. The two PRBs include two timeslots and 14 symbols in time domain and 12 subcarriers in frequency domain.

The CSI process #1 includes an NZP CSI-RS resource #1 and an IMR #1. The NZP CSI-RS resource #1 represents a non-zero power CSI-RS resource numbered 1, and the IMR

1 represents an interference measurement resource numbered 1. The terminal may measure interference information of a cell other than the cell 1 and the cell 2 based on the IMR #1.

The CSI process #2 includes an NZP CSI-RS resource #2, and the NZP CSI-RS resource #2 represents a non-zero power CSI-RS resource numbered 2.

The base station of the cell 1 may transmit a reference signal and data based on a reference signal pattern shown in FIG. 8a. A base station of the cell 2 may transmit a reference signal and data based on a reference signal pattern shown in FIG. 8b.

As shown in FIG. 8a, FIG. 8b, and FIG. 8c, on an RE corresponding to the NZP CSI-RS resource #1, the base station of the cell 1 transmits an NZP CSI-RS and the base station of the cell 2 is silent. On an RE corresponding to the NZP CSI-RS resource #2, the base station of the cell 1 is silent and the base station of the cell 2 transmits an NZP CSI-RS. On an RE corresponding to the IMR #1, the base stations of the cell 1 and the cell 2 transmit a ZP CSI-RS.

The terminal A performs downlink channel measurement based on the NZP CSI-RS resource #1 and the NZP CSI-RS resource #2 to obtain a downlink channel matrix H1 between the terminal A and the cell 1 and a downlink channel matrix H2 between the terminal A and the cell 2. The terminal determines a PMI1 of the cell 1 based on the downlink channel matrix H1 and a codebook. A precoding matrix corresponding to the PMI1 is represented by W1. Likewise, the terminal determines a PMI2 of the cell 2 based on the downlink channel matrix H2 and a codebook. A precoding matrix corresponding to the PMI2 is represented by W2.

An interference matrix measured by the terminal A on a corresponding RE based on the IMR #1 is represented by I, and the terminal A performs SFBC equivalent processing on I to obtain an equivalent interference matrix I'.

Based on the foregoing measurement result, the terminal A calculates an equivalent channel $H_1'$ between the terminal A and the cell 1 and an equivalent channel $H_2'$ between the terminal A and the cell 2, and calculates a joint equivalent matrix H' based on $H_1'$ and $H_2'$. A specific calculation formula may be that described in the foregoing embodiment, and is not repeated herein.

The terminal A calculates a CQI' based on the calculated H' and I'. For a method for calculating the CQI' by the terminal A based on H' and I', refer to a current related communications standard or another algorithm, such as an algorithm that may be used in a future communications standard. This is not limited in this embodiment of the present invention.

The terminal A feeds back calculated CSI (including an RI1, the PMI1, and the CQI') of the cell 1 to the base station of the cell 1, and feeds back calculated CSI (including an RI2, the PMI2, and the CQI') of the cell 2 to the base station of the cell 2. In another embodiment, the terminal A may send the calculated CSI of the cell 1 and the calculated CSI of the cell 2 to a serving base station of the terminal A, and the serving base station forwards the CSI to a corresponding base station.

A CSI measurement method in conventional CoMP transmission is compared with the CSI measurement method in the scenario 3. In a conventional CoMP transmission technology, CQI calculation is performed based on measured channel information. However, an actual transmission channel is not a measured channel but an equivalent channel obtained after SFBC. In this embodiment of the present invention, after channel measurement is performed on each cell, a channel in actual transmission is obtained by using an SFBC equivalent channel generation method, and a CQI is calculated based on the channel information. Therefore, the CQI is more authentic and accurate.

In the foregoing embodiment, a more accurate CQI is obtained with a shorter feedback delay and lower feedback overheads, so that the base station can accurately determine an MCS, thereby ensuring transmission reliability and efficient scheduling.

An example in which two cells perform SFBC coordinated transmission is used to describe the foregoing embodiment. For a scenario in which a plurality of cells (more than two cells) perform SFBC coordinated transmission, a channel state measurement and feedback method may be implemented by directly extending the foregoing solution.

Based on a same technical concept, an embodiment of the present invention further provides a network device. The network device may be the first network device in the foregoing embodiment, and more specifically, may be a terminal, which can implement the CSI measurement and reporting procedure described in the foregoing embodiment.

Figure 9:
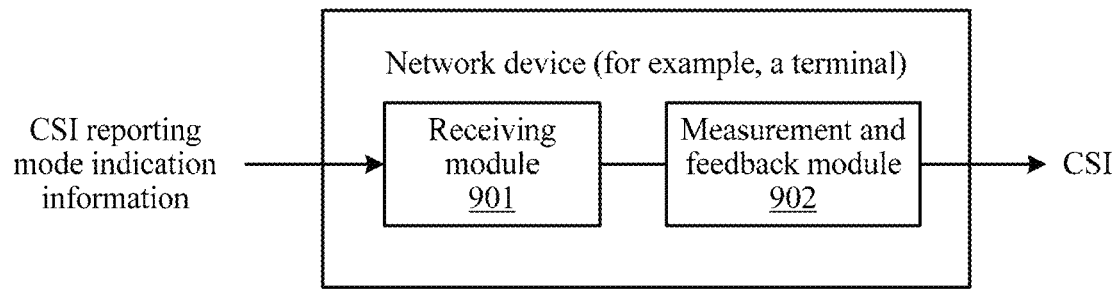
FIG. 9 is a schematic structural diagram of a terminal according to an embodiment of the present invention.

Referring to FIG. 9, FIG. 9 is a schematic structural diagram of a network device according to an embodiment of the present invention. The network device may include a receiving module 901 and a measurement and feedback module 902. The receiving module 901 may be a radio signal receiver, configured to receive information. The measurement and feedback module 902 may include a processor and a radio signal transmitter. The radio signal transmitter may transmit a radio signal. The processor may process information received by the receiving module, and further send, by using the radio signal transmitter, the information processed by the processor.

The receiving module 901 may be configured to receive CSI reporting mode indication information, where the CSI reporting mode indication information is used to instruct to perform CSI measurement and feedback based on N pieces of associated CSI measurement configuration information, and N is an integer greater than 1.

The measurement and feedback module 902 may be configured to perform CSI measurement and feedback according to the CSI reporting mode indication information.

Optionally, the CSI reporting mode indication information received by the receiving module 901 is first CSI reporting mode indication information. Correspondingly, the measurement and feedback module 902 may be specifically configured to perform, according to the first CSI reporting mode indication information or according to the first CSI reporting mode indication information and transmission mode indication information, CSI measurement and feedback that are based on corresponding transmission.

Optionally, the measurement and feedback module 902 may be specifically configured to: determine a PMI corresponding to a CSI-RS indicated by each of the N pieces of associated CSI measurement configuration information, and determine, based on a downlink channel and interference that are corresponding to each of the N pieces of associated CSI measurement configuration information, a CQI corresponding to each of the N pieces of associated CSI measurement configuration information. A downlink channel and interference that are corresponding to one piece of CSI measurement configuration information are obtained based on PMIs corresponding to CSI-RSs indicated by the N pieces of associated CSI measurement configuration information, and the interference corresponding to the CSI measurement configuration information includes interference outside antenna ports specified by the N pieces of associated CSI measurement configuration information, and interference obtained after a CSI-RS indicated by one piece of CSI measurement configuration information other than the CSI measurement configuration information is processed based on a corresponding PMI.

Optionally, if the CSI reporting mode indication information received by the receiving module 901 is the first CSI reporting mode indication information, the measurement and feedback module 902 may be specifically configured to feed back N groups of CSI based on the N pieces of associated CSI measurement configuration information configured by a network side. Each group of CSI includes one or a combination of the following information: an RI, a PMI, and a CQI.

More specifically, the measurement and feedback module 902 may be specifically configured to: if one CSI process is configured, have the N groups of CSI corresponding to the N pieces of associated CSI measurement configuration information in one feedback message, and feed back the feedback message, where the N groups of CSI are sorted in a specified sequence; or if N CSI processes are configured, have one group of CSI corresponding to each piece of CSI measurement configuration information in one feedback message, and feed back the feedback message, or have the N groups of CSI corresponding to the N pieces of associated CSI measurement configuration information in one feedback message, and feed back the feedback message, where the N groups of CSI are sorted in a specified sequence.

Optionally, the CSI reporting mode indication information received by the receiving module 901 is second CSI reporting mode indication information. Correspondingly, the measurement and feedback module 902 may be specifically configured to perform, according to the second CSI reporting mode indication information, CSI measurement and feedback that are based on transmit diversity-related transmission.

Specifically, if the CSI reporting mode indication information received by the receiving module 901 is the second CSI reporting mode indication information, the measurement and feedback module 902 may be specifically configured to: determine a PMI corresponding to a CSI-RS indicated by each of the N pieces of associated CSI measurement configuration information; and determine, based on downlink channels and interference that are corresponding to the N pieces of associated CSI measurement configuration information and based on a transmit diversity-related transmission mode, a joint CQI corresponding to the N pieces of associated CSI measurement configuration information. A downlink channel and interference that are corresponding to one piece of CSI measurement configuration information are obtained based on PMIs corresponding to CSI-RSs indicated by the N pieces of associated CSI measurement configuration information, and the interference corresponding to the CSI measurement configuration information includes interference outside antenna ports specified by the N pieces of associated CSI measurement configuration information.

More specifically, the measurement and feedback module 902 may be configured to: feed back a PMI based on each of the N pieces of associated CSI measurement configuration information corresponding to transmit diversity-related transmission, and feed back a joint CQI based on the N pieces of associated CSI measurement configuration information.

More specifically, a specific processing operation of the measurement and feedback module 902 may include one of the following cases:

Case 1: If one CSI process is configured, one feedback message is fed back, where the feedback message includes the joint CQI and the PMIs corresponding to the CSI-RSs indicated by the N pieces of associated CSI measurement configuration information, and the joint CQI and the PMIs corresponding to the CSI-RSs indicated by the N pieces of associated CSI measurement configuration information are sorted in a specified sequence.

Case 2: If N CSI processes are configured, one feedback message is fed back, where the feedback message includes the joint CQI and the PMIs corresponding to the CSI-RSs indicated by the N pieces of associated CSI measurement configuration information, and the joint CQI and the PMIs corresponding to the CSI-RSs indicated by the N pieces of associated CSI measurement configuration information are sorted in a specified sequence.

Case 3: If N CSI processes are configured, N feedback messages are fed back, where each feedback message is corresponding to one CSI process and includes the joint CQI and a PMI corresponding to one CSI process.

Case 4: If N CSI processes are configured, N feedback messages are fed back, where each feedback message is corresponding to one CSI process and includes a PMI corresponding to one CSI process, one of the N feedback messages further includes the joint CQI, and a feedback message for feeding back the joint CQI is agreed in advance, or the network device notifies a feedback message for feeding back the joint CQI.

Case 5: If N CSI processes are configured, N+1 feedback messages are fed back, where the N+1 feedback messages are sorted in a specified sequence, each of the N feedback messages is corresponding to one CSI process and includes a PMI corresponding to one CSI process, and the other feedback message includes the joint CQI.

Further, the receiving module 901 may be further configured to: if PMI and RI feedback are not configured to be performed, receive measurement indication information, where the measurement indication information is used to instruct to perform CSI measurement based on a CSI-RS or a CRS.

Optionally, the N pieces of associated CSI measurement configuration information include CSI-RS resources of N coordinated transmission points. Correspondingly, the CSI-RS resources of the N coordinated transmission points are configured by using one CSI process, and the CSI process includes the CSI-RS resources of the N coordinated transmission points, or the CSI-RS resources of the N coordinated transmission points are configured by using N CSI processes, and each CSI process includes a CSI-RS resource of one coordinated transmission point.

If one CSI process includes the CSI-RS resources of the N coordinated transmission points, the CSI-RS resources of the N coordinated transmission points are differentiated by using indication information.

Optionally, the CSI reporting mode indication information is sent by using higher layer signaling.

Based on a same technical concept, an embodiment of the present invention further provides a network device. The network device may be the second network device in the foregoing embodiment, and more specifically, may be a transmission point such as a base station, which can implement the CSI measurement and reporting procedure described in the foregoing embodiment.

Figure 10:
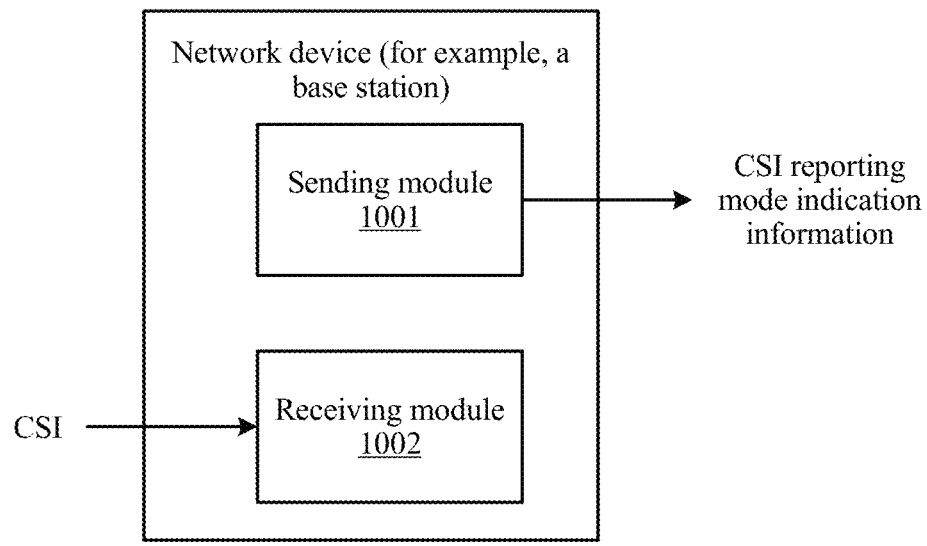
FIG. 10 is a schematic structural diagram of a base station according to an embodiment of the present invention.

Referring to FIG. 10, FIG. 10 is a schematic structural diagram of a network device according to an embodiment of the present invention. The network device may include a sending module 1001 and a receiving module 1002. The sending module 1001 may be a radio signal transmitter, configured to send a radio signal. The receiving module 1002 may be a radio signal receiver, configured to receive a radio signal. Further, the sending module 1001 and the receiving module 1002 may be connected to a processor (not shown in the figure). The receiving module may send received information to the processor for processing, and the sending module may send the information processed by the processor.

The sending module 1001 may be configured to send CSI reporting mode indication information, where the CSI reporting mode indication information is used to instruct to perform CSI measurement and feedback based on N pieces of associated CSI measurement configuration information, and N is an integer greater than 1.

The receiving module 1002 may be configured to receive CSI fed back after CSI measurement is performed according to the CSI reporting mode indication information.

Optionally, the CSI reporting mode indication information sent by the sending module 1001 is first CSI reporting mode indication information. Correspondingly, the first CSI reporting mode indication information is used to instruct to perform CSI measurement and feedback that are based on corresponding transmission; or the first CSI reporting mode indication information and transmission mode indication information are used to instruct to perform CSI measurement and feedback that are based on corresponding transmission.

Optionally, the first CSI reporting mode indication information is specifically used to instruct to perform the following operations:

determining a PMI corresponding to a CSI-RS indicated by each of the N pieces of associated CSI measurement configuration information, and determining, based on a downlink channel and interference that are corresponding to each of the N pieces of associated CSI measurement configuration information, a CQI corresponding to each of the N pieces of associated CSI measurement configuration information. A downlink channel and interference that are corresponding to one piece of CSI measurement configuration information are obtained based on PMIs corresponding to CSI-RSs indicated by the N pieces of associated CSI measurement configuration information, and the interference corresponding to the CSI measurement configuration information includes interference outside antenna ports specified by the N pieces of associated CSI measurement configuration information, and interference obtained after corresponding PMI processing is performed on one piece of CSI measurement configuration information other than the CSI measurement configuration information.

More specifically, the CSI received by the receiving module 1002 includes N groups of CSI fed back based on the N pieces of associated CSI measurement configuration information configured by a network side. Each group of CSI includes one or a combination of the following information: a rank indicator RI, a precoding matrix indicator PMI, and a channel quality indicator CQI.

If one CSI process is configured, the N groups of CSI corresponding to the N pieces of associated CSI measurement configuration information are included in one feedback message, and the N groups of CSI are sorted in a specified sequence; or if N CSI processes are configured, one group of CSI corresponding to each piece of CSI measurement configuration information is included in one feedback message, or the N groups of CSI corresponding to the N pieces of associated CSI measurement configuration information are included in one feedback message, and the N groups of CSI are sorted in a specified sequence.

Optionally, the CSI reporting mode indication information sent by the sending module 1001 is second CSI reporting mode indication information, and the second CSI reporting mode indication information is used to instruct to perform CSI measurement and feedback that are based on transmit diversity-related transmission.

More specifically, the second CSI reporting mode indication information is specifically used to instruct to perform the following operations:

determining a PMI corresponding to a CSI-RS indicated by each of the N pieces of associated CSI measurement configuration information; and determining, based on downlink channels and interference that are corresponding to the N pieces of associated CSI measurement configuration information and based on a transmit diversity-related transmission mode, a joint CQI corresponding to the N pieces of associated CSI measurement configuration information. A downlink channel and interference that are corresponding to one piece of CSI measurement configuration information are obtained based on PMIs corresponding to CSI-RSs indicated by the N pieces of associated CSI measurement configuration information, and the interference corresponding to the CSI measurement configuration information includes interference outside antenna ports specified by the N pieces of associated CSI measurement configuration information.

The CSI received by the receiving module 1002 includes a PMI fed back based on each of the N pieces of associated CSI measurement configuration information corresponding to transmit diversity-related transmission, and a joint CQI fed back based on the N pieces of associated CSI measurement configuration information.

Optionally, the sending module 1001 may be further configured to: if PMI and RI feedback are not configured to be performed, send measurement indication information, where the measurement indication information is used to instruct to perform CSI measurement based on a CSI-RS or a CRS.

Optionally, the N pieces of associated CSI measurement configuration information include CSI-RS resources of N coordinated transmission points. The CSI-RS resources of the N coordinated transmission points are configured by using one CSI process, and the CSI process includes the CSI-RS resources of the N coordinated transmission points, or the CSI-RS resources of the N coordinated transmission points are configured by using N CSI processes, and each CSI process includes a CSI-RS resource of one coordinated transmission point.

If one CSI process includes the CSI-RS resources of the N coordinated transmission points, the CSI-RS resources of the N coordinated transmission points are differentiated by using indication information.

Optionally, the CSI reporting mode indication information is sent by using higher layer signaling.

Based on a same technical concept, an embodiment of the present invention further provides a wireless communications apparatus. The apparatus may be the first network device in the foregoing embodiment, and more specifically, may be a terminal, which can implement the CSI measurement and reporting procedure described in the foregoing embodiment.

Figure 11:
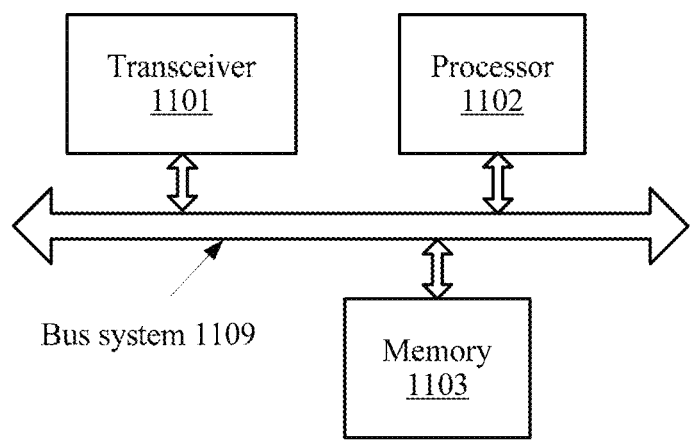
FIG. 11 is a schematic structural diagram of a terminal according to another embodiment of the present invention.

Referring to FIG. 11, FIG. 11 is a schematic structural diagram of an apparatus according to an embodiment of the present invention.

As shown in the figure, the apparatus may include a transceiver 1101, a processor 1102, and a memory 1103. The processor 1102 is configured to control an operation of the apparatus, including transmitting (including receiving and/or sending) data by using the transceiver 1101. The memory 1103 may include a read-only memory and a random access memory, and is configured to provide an instruction and data for the processor 1102. A part of the memory 1103 may further include a nonvolatile random access memory (NVRAM). All components of the apparatus are coupled together by using a bus system 1109. In addition to a data bus, the bus system 1109 includes a power bus, a control bus, and a status signal bus. However, for clear description, various types of buses in the figure are marked as the bus system 1109.

The procedure disclosed in the embodiments of this application may be applied to the processor 1102, or may be implemented by the processor 1102. In an implementation process, steps in the procedure implemented by the apparatus may be completed by using an integrated logic circuit of hardware in the processor 1102 or an instruction in a form of software. The processor 1102 may be a general purpose processor, a digital signal processor, an application-specific integrated circuit, a field programmable gate array or another programmable logic device, a discrete gate or a transistor logic device, or a discrete hardware component, and may implement or execute methods, steps, and logic block diagrams that are disclosed in the embodiments of this application. The general purpose processor may be a microprocessor, any conventional processor, or the like. The steps of the methods disclosed with reference to the embodiments of this application may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory 1103, and the processor 1102 reads information in the memory 1103 and completes the steps of the procedure indicated in the embodiments of the present invention in combination with hardware of the processor 1102.

Specifically, the processor 1102 may be configured to execute the CSI measurement and feedback procedure described in the foregoing embodiment, and the procedure may include:

receiving CSI reporting mode indication information, where the CSI reporting mode indication information is used to instruct to perform CSI measurement and feedback based on N pieces of associated CSI measurement configuration information, and N is an integer greater than 1; and performing CSI measurement and feedback according to the CSI reporting mode indication information.

For the procedure executed by the processor 1102, refer to the description in the foregoing embodiment. Details are not described herein again.

Based on a same technical concept, an embodiment of the present invention further provides a wireless communications apparatus. The apparatus may be the second network device in the foregoing embodiment, and more specifically, may be a transmission point such as a base station, which can implement the CSI measurement and reporting procedure described in the foregoing embodiment.

Figure 12:
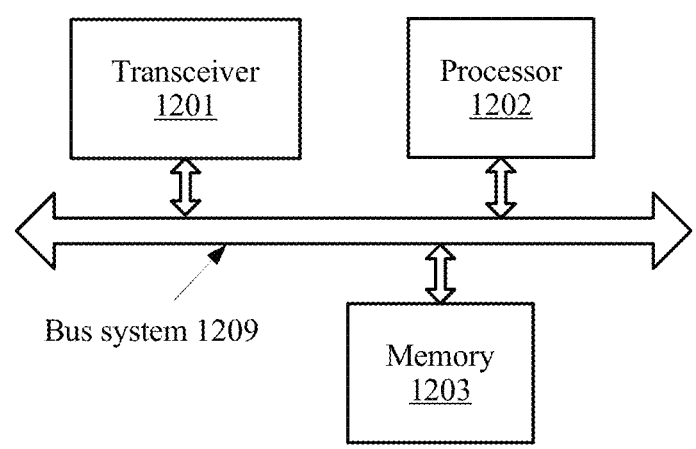
FIG. 12 is a schematic structural diagram of a base station according to another embodiment of the present invention.

Referring to FIG. 12, FIG. 12 is a schematic structural diagram of a network device according to an embodiment of the present invention. As shown in the figure, the network device may include a transceiver 1201, a processor 1202, and a memory 1203.

The processor 1202 is configured to control an operation of the apparatus, including transmitting (including receiving and/or sending) data by using the transceiver 1201. The memory 1203 may include a read-only memory and a random access memory, and is configured to provide an instruction and data for the processor 1202. A part of the memory 1203 may further include a non-volatile random access memory (NVRAM). Components of the apparatus are coupled together by using a bus system 1209. In addition to a data bus, the bus system 1209 includes a power bus, a control bus, and a status signal bus. However, for clear description, various types of buses in the figure are marked as the bus system 1209.

The procedure disclosed in the embodiments of this application may be applied to the processor 1202, or may be implemented by the processor 1202. In an implementation process, steps in the procedure implemented by the apparatus may be completed by using an integrated logic circuit of hardware in the processor 1202 or an instruction in a form of software. The processor 1202 may be a general purpose processor, a digital signal processor, an application-specific integrated circuit, a field programmable gate array or another programmable logic device, a discrete gate or a transistor logic device, or a discrete hardware component, and may implement or execute methods, steps, and logic block diagrams that are disclosed in the embodiments of this application. The general purpose processor may be a microprocessor, any conventional processor, or the like. The steps of the methods disclosed with reference to the embodiments of this application may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory 1203, and the processor 1202 reads information in the memory 1203 and completes the steps of the procedure indicated in the embodiments of the present invention in combination with hardware of the processor 1202.

Specifically, the processor 1202 may be configured to execute the CSI measurement and feedback procedure described in the foregoing embodiment, and the procedure may include:

sending channel state information CSI reporting mode indication information, where the CSI reporting mode indication information is used to instruct to perform CSI measurement and feedback based on N pieces of associated CSI measurement configuration information, and N is an integer greater than 1; and receiving CSI fed back after CSI measurement is performed according to the CSI reporting mode indication information.

For the procedure executed by the processor 1202, refer to the description in the foregoing embodiment. Details are not described herein again.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

What is claimed is:

1. A channel state measurement method, comprising:
receiving channel state information (CSI) reporting mode indication information, wherein the CSI reporting mode indication information indicates to perform CSI measurement and feedback based on N pieces of CSI measurement configuration information, and N is an integer greater than 1; and
performing CSI measurement and feedback according to the CSI reporting mode indication information, wherein the performing CSI measurement and feedback comprises:
determining a precoding matrix indicator (PMI) corresponding to a channel state information-reference signal (CSI-RS) indicated by each of the N pieces of CSI measurement configuration information; and
determining, based on a downlink channel and interference that are corresponding to each of the N pieces of CSI measurement configuration information, a channel quality indicator (CQI) corresponding to each of the N pieces of CSI measurement configuration information, wherein
a downlink channel and interference that are corresponding to one piece of CSI measurement configuration information are obtained based on PMIs corresponding to CSI-RSs indicated by the N pieces of CSI measurement configuration information, and the interference corresponding to the CSI measurement configuration information comprises interference outside antenna ports specified by the N pieces of CSI measurement configuration information, and interference obtained after a CSI-RS indicated by one piece of CSI measurement configuration information other than the CSI measurement configuration information is processed based on a corresponding PMI.

2. The method according to claim 1, wherein the CSI reporting mode indication information is first CSI reporting mode indication information; and
the performing CSI measurement and feedback according to the CSI reporting mode indication information comprises:
performing, according to the first CSI reporting mode indication information or according to the first CSI reporting mode indication information and transmission mode indication information, CSI measurement and feedback that are based on corresponding transmission.

3. The method according to claim 2, wherein the performing CSI measurement and feedback comprises:
feeding back N groups of CSI based on the N pieces of CSI measurement configuration information configured by a network side, wherein each group of CSI comprises one or a combination of the following information: a rank indicator (RI), a precoding matrix indicator (PMI), and a channel quality indicator (CQI).

4. The method according to claim 3, wherein the feeding back N groups of CSI based on the N pieces of CSI measurement configuration information configured by a network side comprises:
if one CSI process is configured, feeding back one feedback message which carries the N groups of CSI corresponding to the N pieces of CSI measurement configuration information, wherein the N groups of CSI are sorted in a specified sequence; or
if N CSI processes are configured, feeding back one feedback message which carries one group of CSI corresponding to each piece of CSI measurement configuration information, or feeding back one feedback message which carries the N groups of CSI corresponding to the N pieces of CSI measurement configuration information, wherein the N groups of CSI are sorted in a specified sequence.

5. The method according to claim 1, wherein the N pieces of CSI measurement configuration information indicate channel state information-reference signal (CSI-RS) resources of N coordinated transmission points.

6. The method according to claim 5, wherein the CSI-RS resources of the N coordinated transmission points are configured by using one CSI process, and the CSI process comprises the CSI-RS resources of the N coordinated transmission points; or
the CSI-RS resources of the N coordinated transmission points are configured by using N CSI processes, and each CSI process comprises a CSI-RS resource of one coordinated transmission point.

7. The method according to claim 6, wherein one CSI process comprises the CSI-RS resources of the N coordinated transmission points, and the CSI-RS resources of the N coordinated transmission points are differentiated by using indication information.

8. The method according to claim 1, wherein the CSI reporting mode indication information is carried in higher layer signaling.

9. The method according to claim 1, wherein the performing CSI measurement and feedback according to the CSI reporting mode indication information comprises:
performing, according to the CSI reporting mode indication information, CSI measurement and feedback that are based on transmit diversity-related transmission.

10. The method according to claim 9, wherein the performing, according to the CSI reporting mode indication information, CSI measurement that is based on transmit diversity-related transmission comprises:
determining, based on downlink channels and interference that are corresponding to the N pieces of CSI measurement configuration information and based on a transmit diversity-related transmission mode, a joint CQI corresponding to the N pieces of CSI measurement configuration information.

11. The method according to claim 10, wherein the performing CSI feedback that is based on transmit diversity-related transmission comprises:
feeding back a PMI based on each of the N pieces of CSI measurement configuration information corresponding to transmit diversity-related transmission, and feeding back a joint CQI based on the N pieces of CSI measurement configuration information.

12. The method according to claim 11, wherein the feeding back a PMI based on each of the N pieces of CSI measurement configuration information corresponding to transmit diversity-related transmission, and feeding back a joint CQI based on the N pieces of CSI measurement configuration information comprises:
if one CSI process is configured, feeding back one feedback message, wherein the feedback message comprises the joint CQI and the PMIs corresponding to the CSI-RSs indicated by the N pieces of CSI measurement configuration information, and the joint CQI and the PMIs corresponding to the CSI-RSs indicated by the N pieces of CSI measurement configuration information are sorted in a specified sequence;
if N CSI processes are configured, feeding back one feedback message, wherein the feedback message comprises the joint CQI and the PMIs corresponding to the CSI-RSs indicated by the N pieces of CSI measurement configuration information, and the joint CQI and the PMIs corresponding to the CSI-RSs indicated by the N pieces of CSI measurement configuration information are sorted in a specified sequence;
if N CSI processes are configured, feeding back N feedback messages, wherein each feedback message is corresponding to one CSI process and comprises the joint CQI and a PMI corresponding to one CSI process;
if N CSI processes are configured, feeding back N feedback messages, wherein each feedback message is corresponding to one CSI process and comprises a PMI corresponding to one CSI process, one of the N feedback messages further comprises the joint CQI, and a feedback message for feeding back the joint CQI is agreed in advance, or a terminal notifies a base station of a feedback message for feeding back the joint CQI; or
if N CSI processes are configured, feeding back N+1 feedback messages, wherein the N+1 feedback messages are sorted in a specified sequence, each of the N feedback messages is corresponding to one CSI process and comprises a PMI corresponding to one CSI process, and the other feedback message comprises the joint CQI.

13. The method according to claim 9, wherein if PMI and RI feedback are not configured to be performed, the method further comprises:
receiving measurement indication information, wherein the measurement indication information is used to instruct to perform CSI measurement based on a CSI-RS or a cell-specific reference signal CRS.

14. A wireless communications apparatus, comprising a processor, and a non-transitory readable storage medium, wherein
the storage medium stores a program, which is to be executed by the processor, the program including instructions to:
receive channel state information (CSI) reporting mode indication information, wherein the CSI reporting mode indication information indicates to perform CSI measurement and feedback based on N pieces of CSI measurement configuration information, and N is an integer greater than 1; and
perform CSI measurement and feedback according to the CSI reporting mode indication information, wherein the performing CSI measurement and feedback comprises:
determining a precoding matrix indicator (PMI) corresponding to a channel state information-reference signal (CSI-RS) indicated by each of the N pieces of CSI measurement configuration information; and
determining, based on a downlink channel and interference that are corresponding to each of the N pieces of CSI measurement configuration information, a channel quality indicator (CQI) corresponding to each of the N pieces of CSI measurement configuration information, wherein
a downlink channel and interference that are corresponding to one piece of CSI measurement configuration information are obtained based on PMIs corresponding to CSI-RSs indicated by the N pieces of CSI measurement configuration information, and the interference corresponding to the CSI measurement configuration information comprises interference outside antenna ports specified by the N pieces of CSI measurement configuration information, and interference obtained after a CSI-RS indicated by one piece of CSI measurement configuration information other than the CSI measurement configuration information is processed based on a corresponding PMI.

15. The apparatus according to claim 14, wherein the CSI reporting mode indication information is first CSI reporting mode indication information; and
the program further includes instructions to:
perform, according to the first CSI reporting mode indication information or according to the first CSI reporting mode indication information and transmission mode indication information, CSI measurement and feedback that are based on corresponding transmission.

16. The apparatus according to claim 15, wherein the program further includes instructions to:
feed back N groups of CSI based on the N pieces of CSI measurement configuration information configured by a network side, wherein each group of CSI comprises one or a combination of the following information: a rank indicator (RI), a precoding matrix indicator (PMI), and a channel quality indicator (CQI).

17. The apparatus according to claim 16, wherein the program further includes instructions to:
- if one CSI process is configured, feed back one feedback message which carries the N groups of CSI corresponding to the N pieces of CSI measurement configuration information, wherein the N groups of CSI are sorted in a specified sequence; or
- if N CSI processes are configured, feed back one feedback message which carries one group of CSI corresponding to each piece of CSI measurement configuration information, or feed back one feedback message which carries the N groups of CSI corresponding to the N pieces of CSI measurement configuration information, wherein the N groups of CSI are sorted in a specified sequence.

18. The apparatus according to claim 14, wherein the N pieces of CSI measurement configuration information indicate channel state information-reference signal (CSI-RS) resources of N coordinated transmission points.

19. The apparatus according to claim 18, wherein the CSI-RS resources of the N coordinated transmission points are configured by using one CSI process, and the CSI process comprises the CSI-RS resources of the N coordinated transmission points; or
- the CSI-RS resources of the N coordinated transmission points are configured by using N CSI processes, and each CSI process comprises a CSI-RS resource of one coordinated transmission point.

20. The apparatus according to claim 19, wherein one CSI process comprises the CSI-RS resources of the N coordinated transmission points, and the CSI-RS resources of the N coordinated transmission points are differentiated by using indication information.

* * * * *